United States Patent
Yoon et al.

(10) Patent No.: US 11,106,239 B2
(45) Date of Patent: Aug. 31, 2021

(54) DISPLAY DEVICE

(71) Applicant: Samsung Display Co., Ltd., Yongin-si (KR)

(72) Inventors: Hyoyul Yoon, Seoul (KR); Kyoungah Lee, Seoul (KR); Sung Chul Choi, Hwaseong-si (KR); MinGu Kim, Seoul (KR); Hyunsuk Nam, Seoul (KR); Hansun Ryou, Seoul (KR); Mansik Myeong, Seoul (KR); Dongjin Park, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/709,779

(22) Filed: Dec. 10, 2019

(65) Prior Publication Data
US 2020/0209918 A1    Jul. 2, 2020

(30) Foreign Application Priority Data

Dec. 28, 2018 (KR) .......................... 10-2018-0172099

(51) Int. Cl.
*G06F 1/16* (2006.01)

(52) U.S. Cl.
CPC .......... *G06F 1/1616* (2013.01); *G06F 1/1652* (2013.01); *G06F 1/1681* (2013.01)

(58) Field of Classification Search
None
See application file for complete search history.

(56) References Cited

U.S. PATENT DOCUMENTS

| | | | |
|---|---|---|---|
| 9,021,657 B2* | 5/2015 | Park | H04M 1/022 16/354 |
| 9,119,316 B2 | 8/2015 | Lee | |
| 9,164,547 B1 | 10/2015 | Kwon et al. | |
| 9,173,288 B1* | 10/2015 | Kim | G06F 1/1679 |
| 9,348,362 B2 | 5/2016 | Ko et al. | |
| 9,348,450 B1* | 5/2016 | Kim | G06F 1/1681 |
| 9,535,452 B2* | 1/2017 | Ahn | H05K 5/0017 |
| 9,572,272 B2* | 2/2017 | Lee | G06F 1/1681 |
| 9,801,290 B2* | 10/2017 | Ahn | G06F 1/1652 |
| 10,063,677 B2* | 8/2018 | Cavallaro | G06F 1/1626 |
| 10,564,682 B1* | 2/2020 | Wu | F16C 11/04 |
| 10,705,563 B2* | 7/2020 | Lin | G06F 1/1681 |
| 2017/0060188 A1* | 3/2017 | Han | G06F 1/1681 |
| 2017/0061836 A1* | 3/2017 | Kim | G06F 1/1652 |

FOREIGN PATENT DOCUMENTS

KR    10-1911047 B1    10/2018

* cited by examiner

*Primary Examiner* — Anthony Q Edwards
*Assistant Examiner* — Rashen E Morrison
(74) *Attorney, Agent, or Firm* — Lewis Roca Rothgerber Christie LLP

(57) ABSTRACT

A display device includes a display module including non-folding areas arranged with each other in a first direction and a folding area between the adjacent non-folding areas, a hinge under the display module and configured to fold the display module with respect to the folding area, a supporter between the non-folding areas and the hinge, and a guide portion connected to the supporter and configured to be inserted into a guide groove defined in the hinge. A length in the first direction of the guide groove is obtained utilizing a length of an arc of the folding area when the display module is folded.

30 Claims, 21 Drawing Sheets

FIG. 13
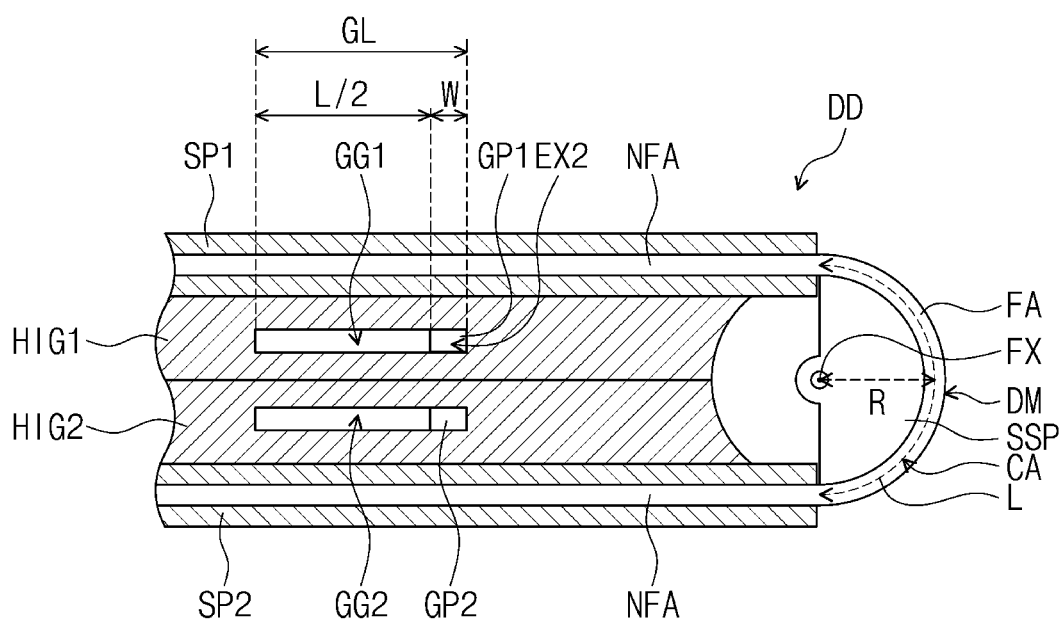
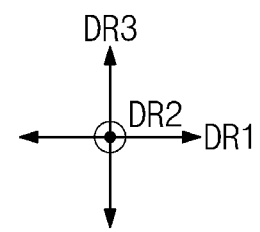

FIG. 14
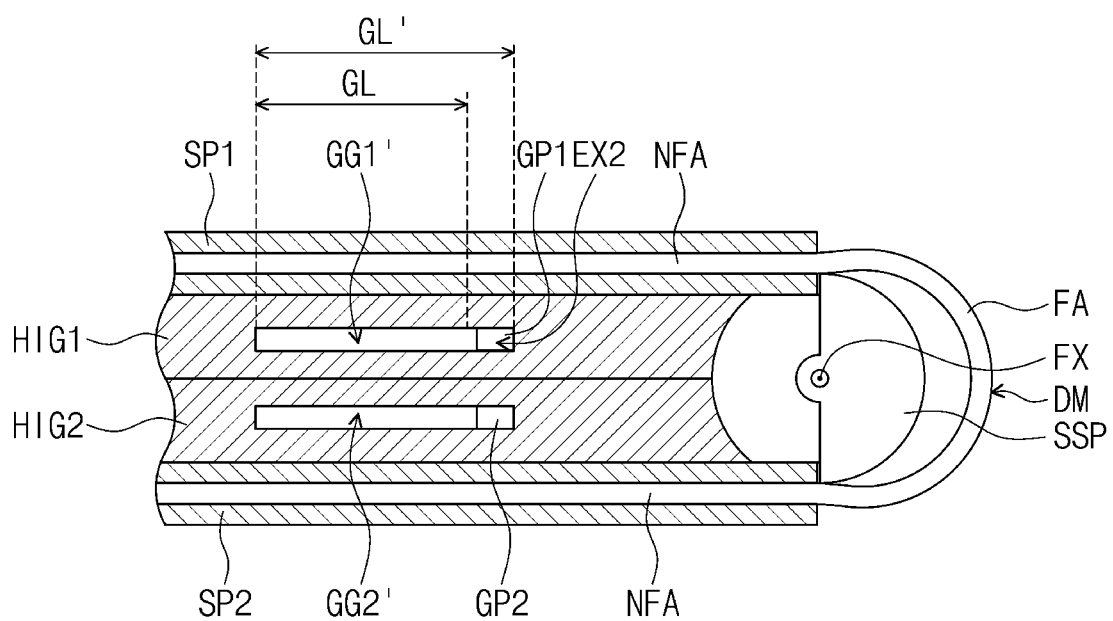
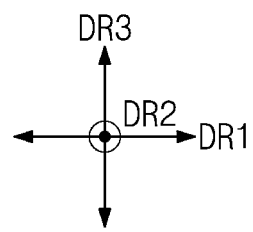

DISPLAY DEVICE

CROSS-REFERENCE TO RELATED APPLICATION

This application claims priority to and the benefit of Korean Patent Application No. 10-2018-0172099, filed on Dec. 28, 2018, the entire content of which is hereby incorporated by reference.

BACKGROUND

1. Field

The present disclosure relates to a display device. More particularly, the present disclosure relates to a display device with a guide groove.

2. Description of the Related Art

Electronic devices that provide a user with an image, such as a smart phone, a digital camera, a notebook computer, a navigation unit, and/or a smart television, may include a display device to display the image. The display device generates the image and provides the image to the user through a display screen thereof.

In recent years, with the technological development for the display device, various types (or kinds) of display devices have been developed. For example, a flexible display device that is foldable and/or rollable is being developed. The flexible display device, which is capable of being transformed in various shapes, is easy to carry and improves a user's convenience.

Among the flexible display devices, a foldable display device may be folded with respect to a folding axis. By way of example, the foldable display device includes a display module including a folding area, a supporter attached to a lower portion of the display module to support the display module, and a hinge disposed under a lower portion of the supporter to fold the display module. The supporter moves along a guide groove defined in the hinge.

However, when a length of the guide groove is too long, the supporter excessively moves, and as a result, the shape of the folding area is deformed. Conversely, when the length of the guide groove is too short (narrow), an amount of movement of the supporter is insufficient, and a stress is generated in the folding area. As a result, the folding area is damaged.

SUMMARY

One or more aspects of embodiments of the present disclosure are directed toward a display device capable of providing a desired or optimized guide groove.

Embodiments of the inventive concept provide a display device including a display module including non-folding areas arranged with each other in a first direction and a folding area between the adjacent non-folding areas, a hinge under the display module and configured to fold the display module with respect to the folding area, a supporter between the adjacent non-folding areas and the hinge, and a guide portion coupled to the supporter and configured to be inserted into a guide groove defined in the hinge. A length in the first direction of the guide groove is obtained utilizing a length of an arc of the folding area when the display module is folded.

Embodiments of the inventive concept provide a display device including a display module including non-folding areas arranged with each other in a first direction and a folding area between the adjacent non-folding areas, a hinge under the display module and configured to fold the display module with respect to the folding area, a supporter between the non-folding areas and the hinge, and a plurality of guide portions connected to the supporter and configured to be inserted into a plurality of guide grooves defined in the hinge. A length in the first direction of each of the plurality of guide grooves is obtained utilizing a length of an arc of the folding area when the display module is folded.

Embodiments of the inventive concept provide a display device including a display module comprising non-folding areas arranged with each other in a first direction and a folding area between the non-folding areas, a hinge under the display module and configured to fold the display module with respect to the folding area, a supporter between the non-folding areas and the hinge, and a guide portion connected to the supporter and configured to be inserted into a guide groove defined in the hinge. The length in the first direction of the guide groove is obtained utilizing Equation of $GL2=L+W$, where "L" denotes the length of the arc, "GL2" denotes the length of the guide groove, and "W" denotes a width, in the first direction, of the guide portion in the guide groove.

According to embodiments of the present disclosure, the display device provides the guide groove having the length that is optimized in accordance with the length of the arc of the folding area when the display module is folded. Thus, the shape of the folding area may be uniformly maintained, and the folding area may be prevented or protected from being damaged.

BRIEF DESCRIPTION OF THE DRAWINGS

The above and other advantages of the present disclosure will become readily apparent by reference to the following detailed description when considered in conjunction with the accompanying drawings wherein:

FIG. 13 is an enlarged view showing the folding area shown in FIG. 12;

FIGS. 14 and 15 are views showing first and second guide grooves having a length different from first and second guide grooves shown in FIG. 13;

DETAILED DESCRIPTION

Figure 1:
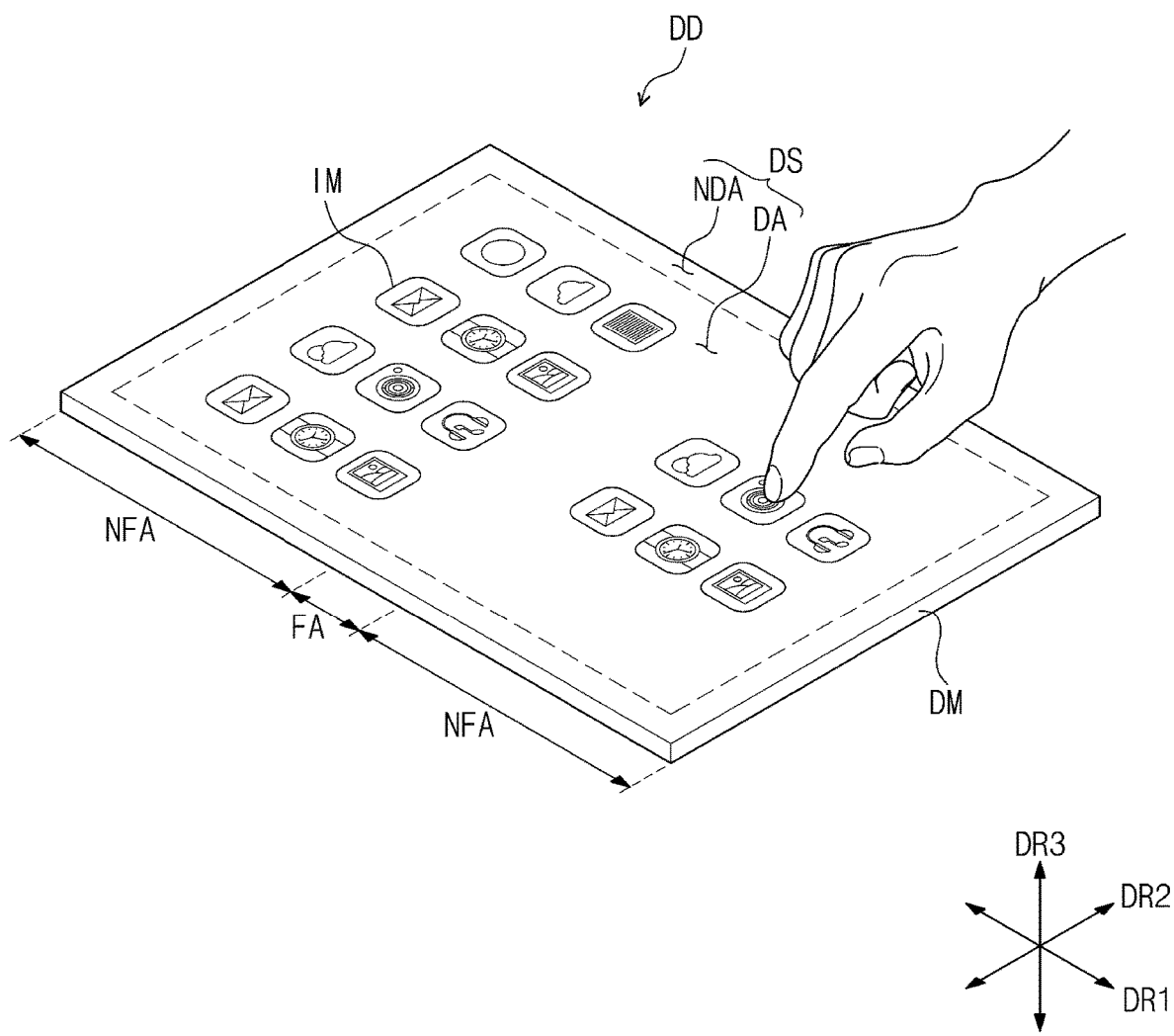
FIG. 1 is a perspective view showing a display module of a display device according to an example embodiment of the present disclosure.

It will be understood that when an element or layer is referred to as being "on", "connected to" and/or "coupled to" another element or layer, it can be directly on, connected or coupled to the other element or layer or intervening elements or layers may be present. When an element or layer is referred to as being "directly on", "directly connected to" and/or "directly coupled to" another element or layer, no intervening elements or layers may be present.

Like numerals refer to like elements throughout. In the drawings, the thickness, ratio, and dimension of components are exaggerated for more effective description of the technical content.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention."

It will be understood that, although the terms "first," "second," etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and/or the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes", "comprises," "comprising," and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present invention will be explained in more detail with reference to the accompanying drawings.

FIG. 1 is a perspective view showing a display module DM of a display device DD according to an example embodiment of the present disclosure.

Referring to FIG. 1, the display device DD according to the example embodiment of the present disclosure may include the display module DM. The display module DM may have a rectangular shape defined by long sides extending in a first direction DR1 and short sides extending in a second direction DR2 crossing the first direction DR1, however, the shape of the display module DM should not be limited to the rectangular shape and may have various suitable shapes.

Hereinafter, a direction normal (e.g., substantially perpendicular) to a surface defined by the first direction DR1 and the second direction DR2 may be referred to as a "third direction DR3".

The display module DM may include a folding area FA and a plurality of non-folding areas NFA. The folding area FA is disposed (e.g., located) between the non-folding areas NFA, and the display module DM is folded in the folding area FA. The folding area FA and the non-folding areas NFA may be arranged in the first direction DR1.

As an example, one folding area FA and two non-folding areas NFA are shown, however, the number of the folding areas FA and the number of non-folding areas NFA should not be limited thereto or thereby. For example, the display module DM may include more than two non-folding areas NFA and a plurality of folding areas FA disposed between the adjacent non-folding areas NFA.

An upper surface of the display module DM may be referred to as a "display surface DS" and may be a plane surface defined by the first direction DR1 and the second direction DR2. Images IM generated by the display module DM may be provided to a user through the display surface DS.

The display surface DS may include a display area DA and a non-display area NDA around the display area DA. The display area DA displays the image, and the non-display area NDA does not display the image. The non-display area NDA surrounds the display area DA and defines an edge of the display device DD, which is printed in a predetermined (or set) color.

Figure 2:
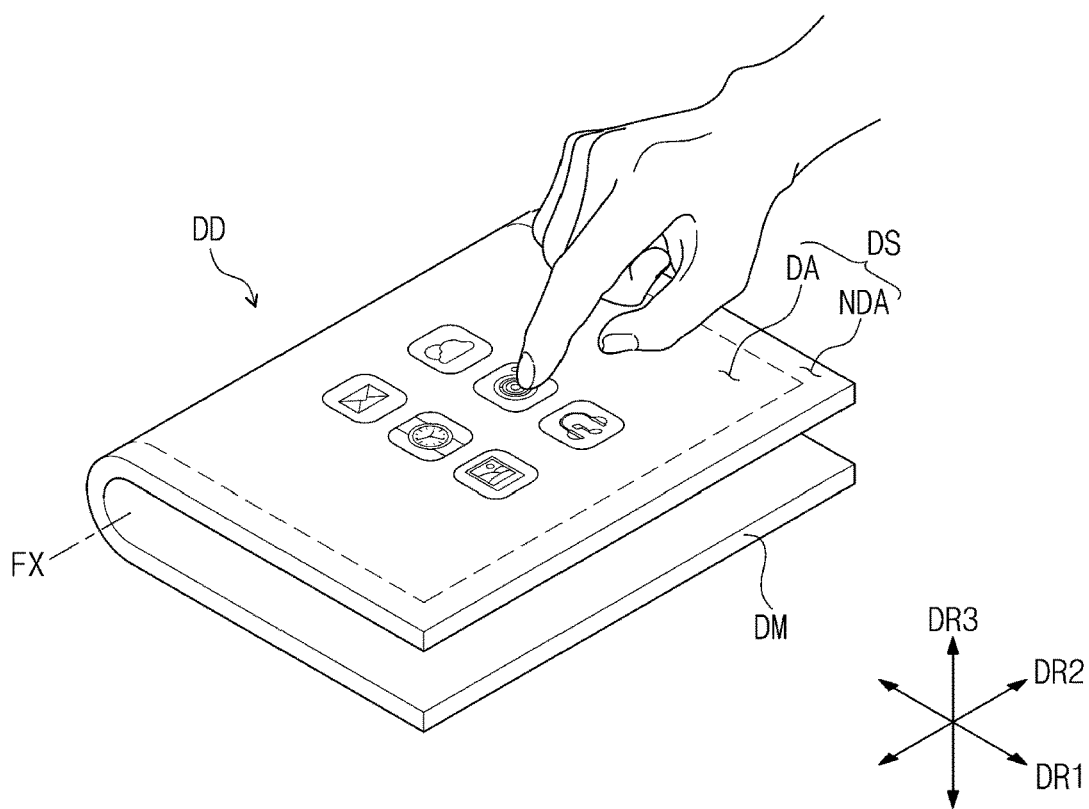
FIG. 2 is a view showing an out-folding state of the display module shown in FIG. 1.
Figure 3:
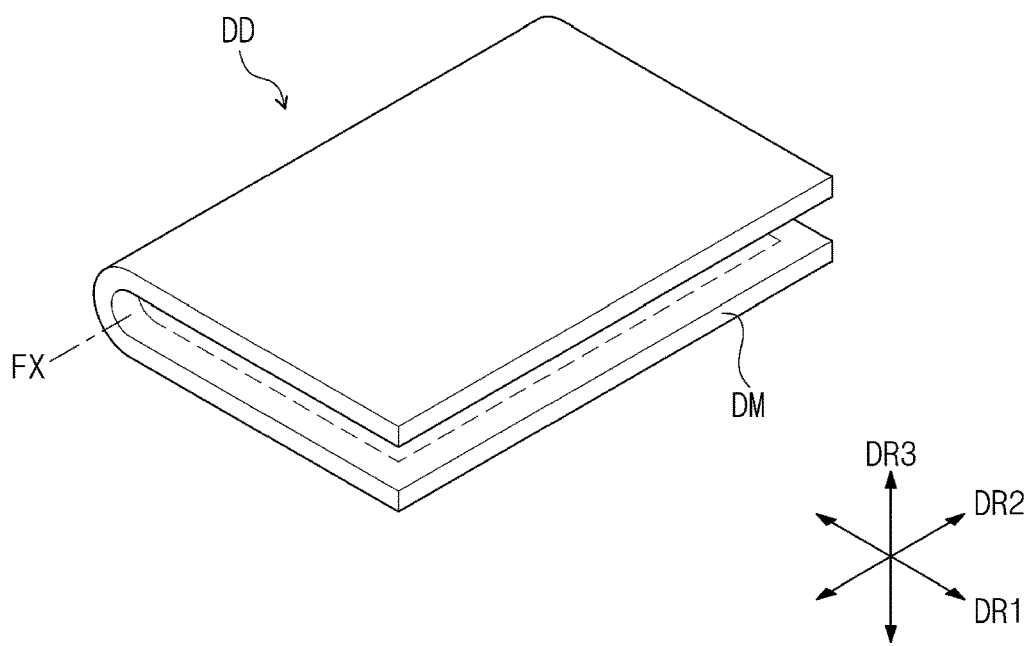
FIG. 3 is a view showing an in-folding state of the display module shown in FIG. 1.

FIG. 2 is a view showing an out-folding state of the display module DM shown in FIG. 1, and FIG. 3 is a view showing an in-folding state of the display module DM shown in FIG. 1.

Referring to FIGS. 2 and 3, the display device DD may be, but is not limited to, a flexible display device DD. The display device DD may be a foldable display device DD that can be folded or unfolded. For example, the display module DM may be folded with respect to a folding axis FX extending along the second direction DR2. The folding axis FX may overlap with the folding area FA, and the folding area FA may be folded with respect to the folding axis FX.

The display module DM may be outwardly folded (out-folding) such that the display surface DS is exposed to an outside, as shown in FIG. 2. In some embodiments, the display module DM may be inwardly folded (in-folding) such that the display surface DS is not exposed to the outside, as shown in FIG. 3. The display device DD may include a hinge disposed under the display module DM and used to fold the display module DM, and a structure of the hinge will be described in more detail later.

Figure 4:
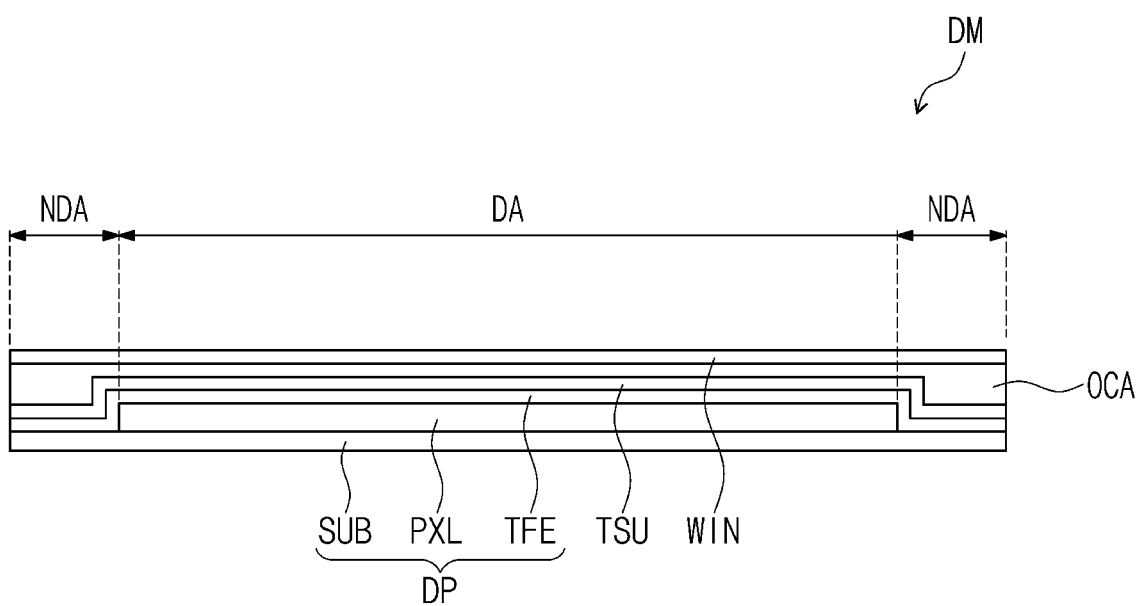
FIG. 4 is a cross-sectional view schematically showing a cross section of the display module shown in FIG. 1.

FIG. 4 is a cross-sectional view schematically showing a cross section of the display module DM shown in FIG. 1.

Referring to FIG. 4, the display module DM may include a display panel DP, a touch sensing unit TSU disposed on the display panel DP, a window WIN disposed on the touch sensing unit TSU, and an adhesive OCA disposed between the touch sensing unit TSU and the window WIN.

The display panel DP may be an organic light emitting display panel, however, it should not be limited thereto or thereby. Various suitable display panels capable of displaying the image, such as a liquid crystal display panel, an electrowetting display panel, and/or an electrophoretic display panel, may be used as the display panel DP.

The display panel DP may include a substrate SUB, a pixel layer PXL disposed on the substrate SUB, and a thin film encapsulation layer TFE disposed on the substrate SUB to cover the pixel layer PXL. The substrate SUB may be a transparent substrate, e.g., a flexible plastic substrate, without limitation.

The substrate SUB may include a display area DA and a non-display area NDA around the display area DA, as in the display module DM. The pixel layer PXL may be disposed in the display area DA. The pixel layer PXL may include a plurality of pixels, and each of the pixels PXL may include a light emitting element.

The thin film encapsulation layer TFE may include at least two inorganic layers and an organic layer disposed between the inorganic layers. The inorganic layers may each independently include an inorganic material and may protect the pixel layer PXL from moisture and oxygen. The organic layer may include an organic material and may protect the pixel layer PXL from a foreign substance such as dust particles.

The touch sensing unit TSU may sense an external input by a user's finger or a touch pen, may convert the sensed input to a predetermined (or set) input signal, and may provide the display panel DP with the input signal. The touch sensing unit TSU may include a plurality of touch sensor units to sense the external input. The touch sensor units may sense the external input by a capacitive method. The display panel DP may receive the input signal from the touch sensing unit TSU and may generate an image corresponding to the input signal.

The window WIN may protect the display panel DP and the touch sensing unit TSU from external scratches and/or impacts. The window WIN may be attached to the touch sensing unit TSU by the adhesive OCA. The adhesive OCA may include an optically clear adhesive. The image generated by the display panel DP may be provided to the user after passing through the window WIN.

Figure 5:
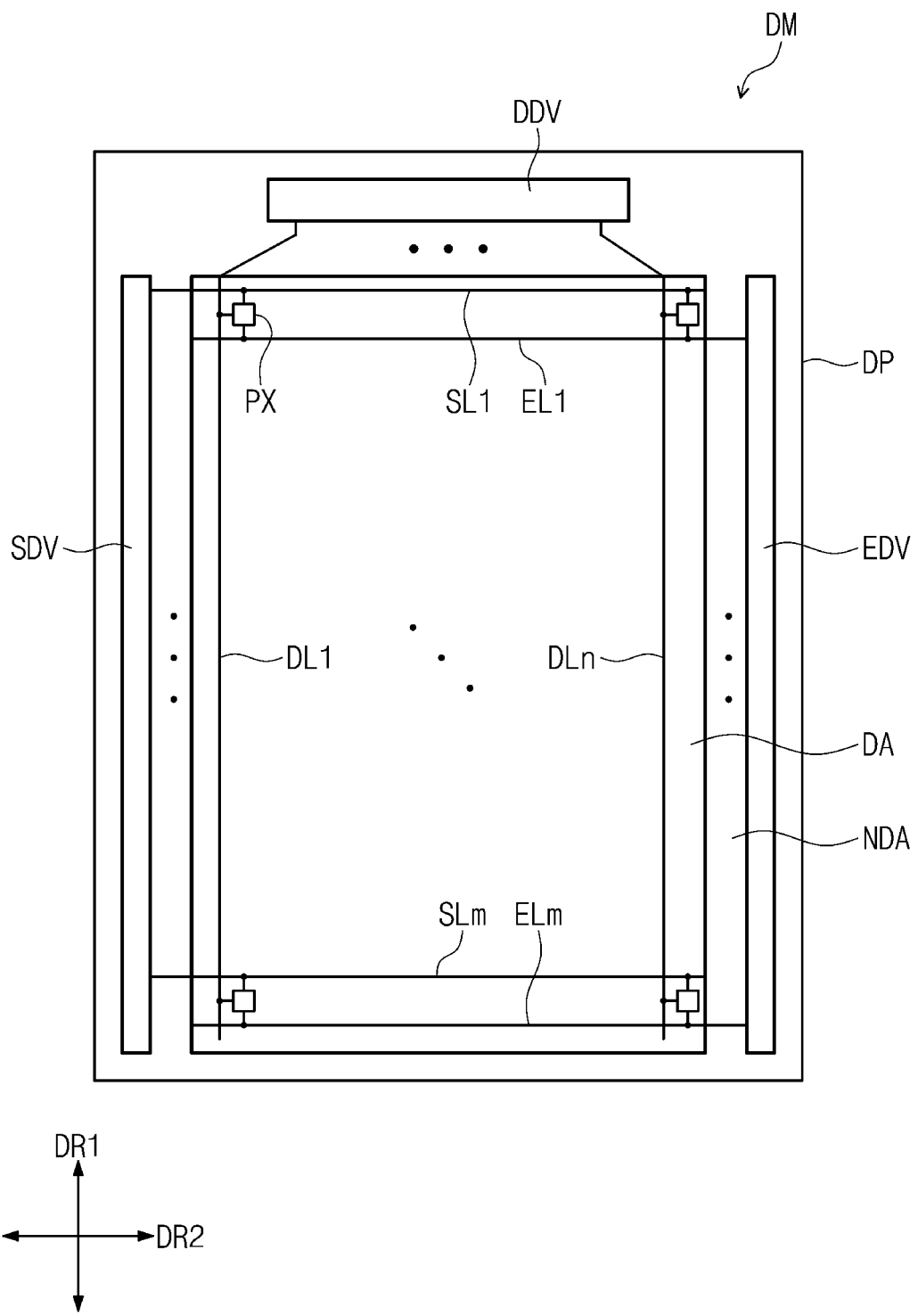
FIG. 5 is a plan view showing the display module shown in FIG. 1.

FIG. 5 is a plan view showing the display module DM shown in FIG. 1.

Referring to FIG. 5, the display module DM according to the example embodiment of the present disclosure may include the display panel DP, a scan driver SDV, a data driver DDV, and a light emitting driver EDV.

The display panel DP may be a flexible display panel. For example, the display panel DP may include a plurality of electronic elements disposed on a flexible substrate. The display panel DP may have a rectangular shape defined by long sides extending in the first direction DR1 and short sides extending in the second direction DR2.

The display panel DP may include a plane surface defined by the first and second directions DR1 and DR2. The display panel DP may include a display area DA and a non-display area NDA surrounding the display area DA, as in the display module DM.

The display panel DP may include a plurality of pixels PX, a plurality of scan lines SL1 to SLm, a plurality of data lines DL1 to DLn, and a plurality of light emitting lines EL1 to ELm. Each of "m" and "n" is a natural number. The pixels PX may be arranged in a matrix form, however, they should not be limited thereto or thereby. The pixels PX may be arranged in the display area DA and may be connected to the scan lines SL1 to SLm, the data lines DL1 to DLn, and the light emitting lines EL1 to ELm.

The scan driver SDV, the data driver DDV, and the light emitting driver EDV may be arranged in the non-display area NDA. The scan driver SDV may be disposed in the non-display area NDA adjacent to one side of the display panel DP, which is defined as one long side of the long sides of the display panel DP.

The light emitting driver EDV may be disposed in the non-display area NDA adjacent to the other side of the display panel DP, which is defined as an opposite long side to the one long side of the display panel DP. The data driver DDV may be manufactured in an integrated circuit chip form and may be disposed in the non-display area NDA adjacent to one short side of the short sides of the display panel DP.

The scan lines SL1 to SLm may extend in the second direction DR2 and may be connected to the scan driver SDV. The data lines DL1 to DLn may extend in the first direction DR1 and may be connected to the data driver DDV. The light emitting lines EL1 to ELm may extend in the second direction DR2 and may be connected to the light emitting driver EDV.

The scan driver SDV may generate a plurality of scan signals, and the scan signals may be applied to the pixels PX through the scan lines SL1 to SLm. The scan signals may be sequentially applied to the pixels PX. The data driver DDV may generate a plurality of data voltages, and the data voltages may be applied to the pixels PX through the data lines DL1 to DLn. The light emitting driver EDV may generate a plurality of light emitting signals, and the light emitting signals may be applied to the pixels PX through the light emitting lines EL1 to ELm.

In some embodiments, the display module DM may include a timing controller to control an operation of the scan driver SDV, the data driver DDV, and the light emitting driver EDV.

The timing controller may generate a scan control signal, a data control signal, and a light emitting control signal in response to control signals applied thereto from the outside. The timing controller may receive image signals from the outside, may convert a data format of the image signals according to an interface with the data driver DDV, and may provide the converted image signals to the data driver DDV.

The scan driver SDV may generate the scan signals in response to the scan control signal, and the light emitting driver EDV may generate the light emitting signals in response to the light emitting control signal. The data driver DDV may receive the image signals whose data format is converted and may generate data voltages corresponding to the image signals in response to the data control signal.

The pixels PX may receive the data voltages in response to the scan signals. The pixels PX may emit light having brightness corresponding to the data voltages in response to the light emitting signals to display the image. A light emitting time of the pixels PX may be controlled by the light emitting signals.

Figure 6:
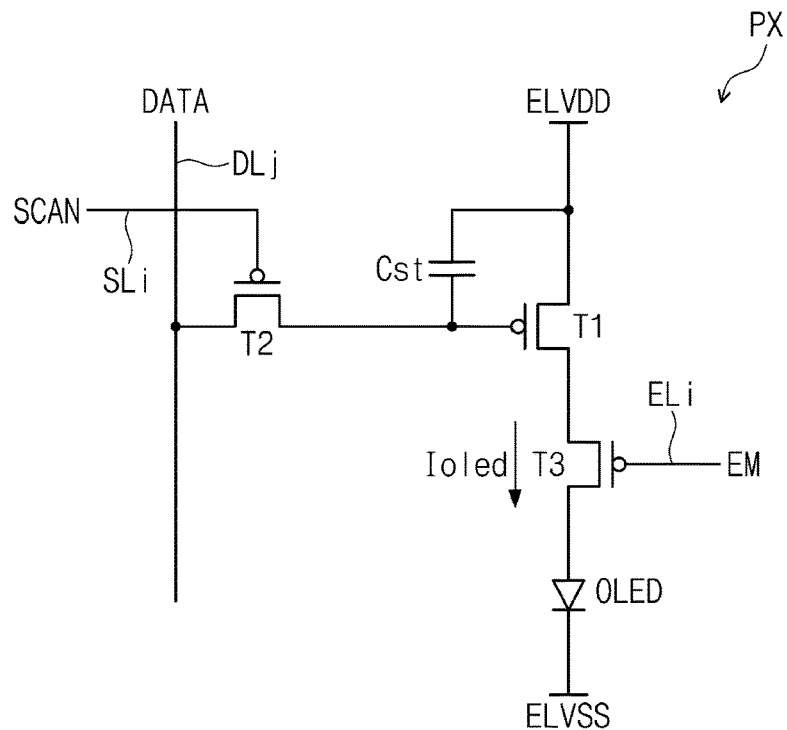
FIG. 6 is an equivalent circuit diagram showing a pixel shown in FIG. 5.

FIG. 6 is an equivalent circuit diagram showing a pixel shown in FIG. 5.

FIG. 6 shows the equivalent circuit diagram of one pixel PX as a representative example, however, other pixels PX shown in FIG. 5 may have the same equivalent circuit diagram as the pixel shown in FIG. 6.

Referring to FIG. 6, the pixel PX may be connected to a corresponding scan line SLi among the scan lines SL1 to SLm, a corresponding data line DLj among the data lines DL1 to DLn, and a corresponding light emitting line ELi among the light emitting lines EL1 to ELm. The "i" is a natural number equal to or smaller than the "m", and the "j" is a natural number equal to or smaller than the "n".

The pixel PX may include a light emitting element OLED, a driving transistor T1, a capacitor Cst, a switching transistor T2, and a light emitting control transistor T3. The light emitting element OLED may be an organic light emitting diode.

The driving transistor T1 may include a source terminal that receives a first voltage ELVDD and a drain terminal connected to a source terminal of the light emitting control transistor T3. The driving transistor T1 may include a gate terminal connected to a drain terminal of the switching transistor T2.

The switching transistor T2 may include a gate terminal connected to the scan line SLi and a source terminal connected to the data line DLj. The capacitor Cst may include a first electrode connected to the source terminal of the driving transistor T1 and a second electrode connected to the gate terminal of the driving transistor T1.

The light emitting control transistor T3 may include a gate terminal connected to the light emitting line ELi and a drain terminal connected to an anode electrode of the light emitting element OLED. The light emitting element OLED may include a cathode electrode that receives a second voltage ELVSS, and the second voltage ELVSS may have a level lower than that of the first voltage ELVDD.

The switching transistor T2 may be turned on in response to a scan signal SCAN applied thereto through the scan line SLi. The turned-on switching transistor T2 may provide the data voltage DATA provided through the data line DLj to the gate terminal of the driving transistor T1.

The capacitor Cst is charged with the data voltage DATA applied to the gate terminal of the driving transistor T1 and may maintain the charged voltage therein after the switching transistor T2 is turned off.

The light emitting control transistor T3 may be turned on in response to a light emitting signal EM applied to the gate terminal thereof through the light emitting line ELi. The turned-on light emitting control transistor T3 may provide a current load flowing through the driving transistor T1 to the light emitting element OLED. The pixel PX may emit the light during a time in which the light emitting signal EM is applied. The light emitting element OLED may emit the light with different intensity depending on an amount of the current load applied thereto.

FIG. 6 shows PMOS transistors as a representative example of the transistors T1 to T3 of the pixel PX, however, they should not be limited thereto or thereby. That is, the transistors T1 to T3 of the pixel PX may be implemented by NMOS transistors.

Figure 7:
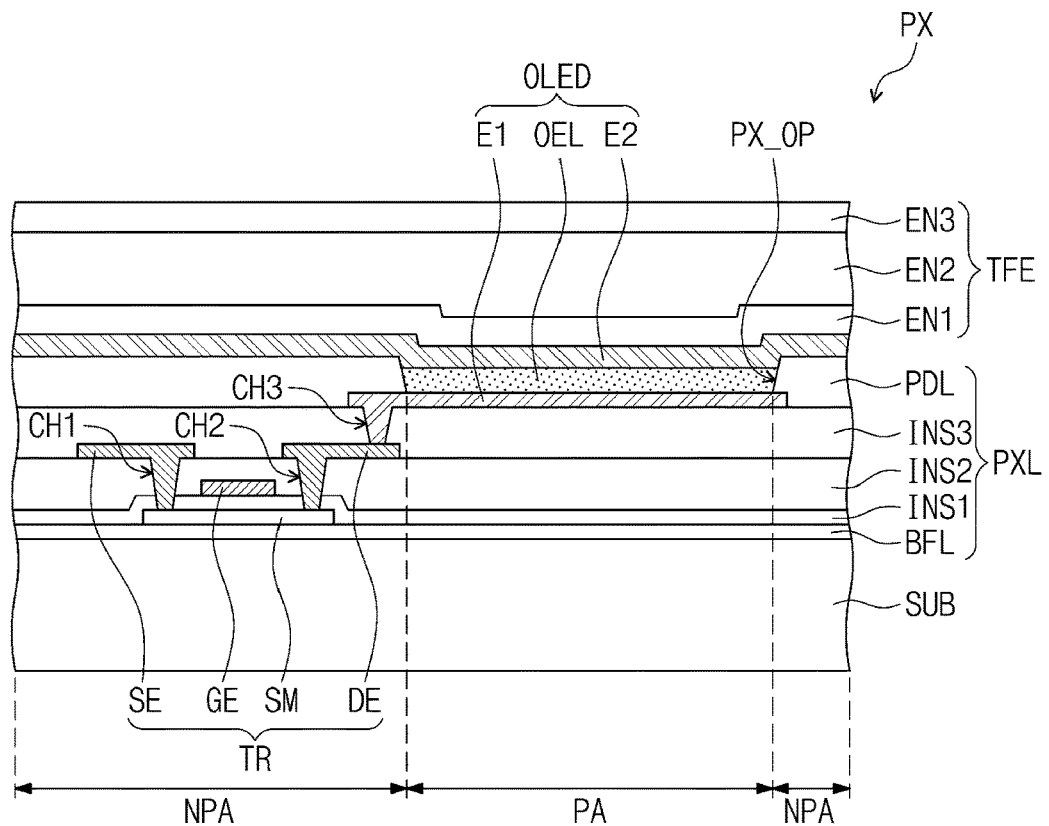
FIG. 7 is a cross-sectional view showing a cross section of the pixel shown in FIG. 6.

FIG. 7 is a cross-sectional view showing a cross section of the pixel PX shown in FIG. 6.

Referring to FIG. 7, the pixel PX may include the light emitting element OLED and the transistor TR connected to the light emitting element OLED. The light emitting element OLED may include a first electrode E1, a second electrode E2, and an organic light emitting layer OEL disposed between the first electrode E1 and the second electrode E2.

The pixel PX may be divided into a pixel area PA and a non-pixel area NPA around the pixel area PA. The light emitting element OLED may be disposed in the pixel area PA, and the transistor TR may be disposed in the non-pixel area NPA.

The transistor TR may be the light emitting control transistor T3. The transistor TR and the light emitting element OLED may be disposed on the substrate SUB. A buffer layer BFL may be disposed on the substrate SUB and may include an inorganic material.

A semiconductor layer SM of the transistor TR may be disposed on the buffer layer BFL. The semiconductor layer SM may include an inorganic semiconductor, such as amorphous silicon and/or polycrystalline silicon, and/or an organic semiconductor. In some embodiments, the semiconductor layer SM may include an oxide semiconductor. The semiconductor layer SM may include a source area, a drain area, and a channel area defined between the source area and the drain area.

A first insulating layer INS1 may be disposed on the buffer layer BFL to cover the semiconductor layer SM. The first insulating layer INS1 may include an inorganic material. A gate electrode GE of the transistor TR may be disposed on the first insulating layer INS1 to overlap with the semiconductor layer SM. The gate electrode GE may be disposed to overlap with the channel area of the semiconductor layer SM.

A second insulating layer INS2 may be disposed on the first insulating layer INS1 to cover the gate electrode GE. The second insulating layer INS2 may be referred to as an "interlayer insulating layer". The second insulating layer INS2 may include an organic material and/or an inorganic material.

A source electrode SE and a drain electrode DE of the transistor TR may be disposed on the second insulating layer INS2 to be spaced apart from each other. The source electrode SE may be connected to the source area of the semiconductor layer SM through a first contact hole CH1 defined through (in) the first insulating layer INS1 and the second insulating layer INS2. The drain electrode DE may be connected to the drain area of the semiconductor layer SM through a second contact hole CH2 defined through (in) the first insulating layer INS1 and the second insulating layer INS2.

A third insulating layer INS3 may be disposed on the second insulating layer INS2 to cover the source electrode SE and the drain electrode DE of the transistor TR. The third insulating layer INS3 may be referred to as a "planarization layer" that provides a flat (or substantially flat) upper surface and may include an organic material.

The first electrode E1 may be disposed on the third insulating layer INS3. The first electrode E1 may be connected to the drain electrode DE of the transistor TR through a third contact hole CH3 defined through (in) the third insulating layer INS3. The first electrode E1 may be referred to as a "pixel electrode" or "anode electrode". The first electrode E1 may include a transparent electrode or a reflective electrode.

A pixel definition layer PDL may be disposed on the first electrode E1 and the third insulating layer INS3 to expose a predetermined (or set) portion of the first electrode E1. An opening PX_OP may be defined through (in) the pixel definition layer PDL to expose the predetermined (or set) portion of the first electrode E1.

The organic light emitting layer OEL may be disposed on the first electrode E1 in the opening PX_OP. The organic light emitting layer OEL may generate a light having one of red, green, and blue colors, however, it should not be limited thereto or thereby. The organic light emitting layer OEL may generate a white light by a combination of organic materials respectively generating the red, green, and blue colors.

The second electrode E2 may be disposed on the pixel definition layer PDL and the organic light emitting layer OEL. The second electrode E2 may be referred to as a "common electrode" or "cathode electrode". The second electrode E2 may include a transparent electrode or a reflective electrode.

In a case where the display panel DP is a front surface light emitting type organic light emitting display panel (e.g., a front surface light emitting display panel), the first electrode E1 may be implemented by the reflective electrode, and the second electrode E2 may be implemented by the transparent electrode. In a case where the display panel DP is a rear surface light emitting type organic light emitting display panel (e.g., a rear surface light emitting display panel), the first electrode E1 may be implemented by the transparent electrode, and the second electrode E2 may be implemented by the reflective electrode. The first electrode E1 may be a positive electrode that is a hole injection electrode, and the second electrode E2 may be a negative electrode that is an electron injection electrode.

The thin film encapsulation layer TFE may be disposed on the light emitting element OLED to cover the pixel PX. The thin film encapsulation layer TFE may include a first encapsulation layer EN1 disposed on the light emitting element OLED, a second encapsulation layer EN2 disposed on the first encapsulation layer EN1, and a third encapsulation layer EN3 disposed on the second encapsulation layer EN2.

Each of the first and third encapsulation layers EN1 and EN3 may include an inorganic material, and the second encapsulation layer EN2 may include an organic material. The second encapsulation layer EN2 may have a thickness greater than a thickness of each of the first and third encapsulation layers EN1 and EN3. A layer disposed between the substrate SUB and the thin film encapsulation layer TFE may be referred to as the "pixel layer PXL".

The first voltage ELVDD may be applied to the first electrode E1, and the second voltage ELVSS may be applied to the second electrode E2. Holes and electrons injected into the organic light emitting layer OEL are recombined to generate excitons, and the light emitting element OLED emits the light by the excitons that return to a ground state from an excited state. The light emitting element OLED may emit red, green, and/or blue lights in accordance with the current flow, so that the image may be displayed.

Figure 8:
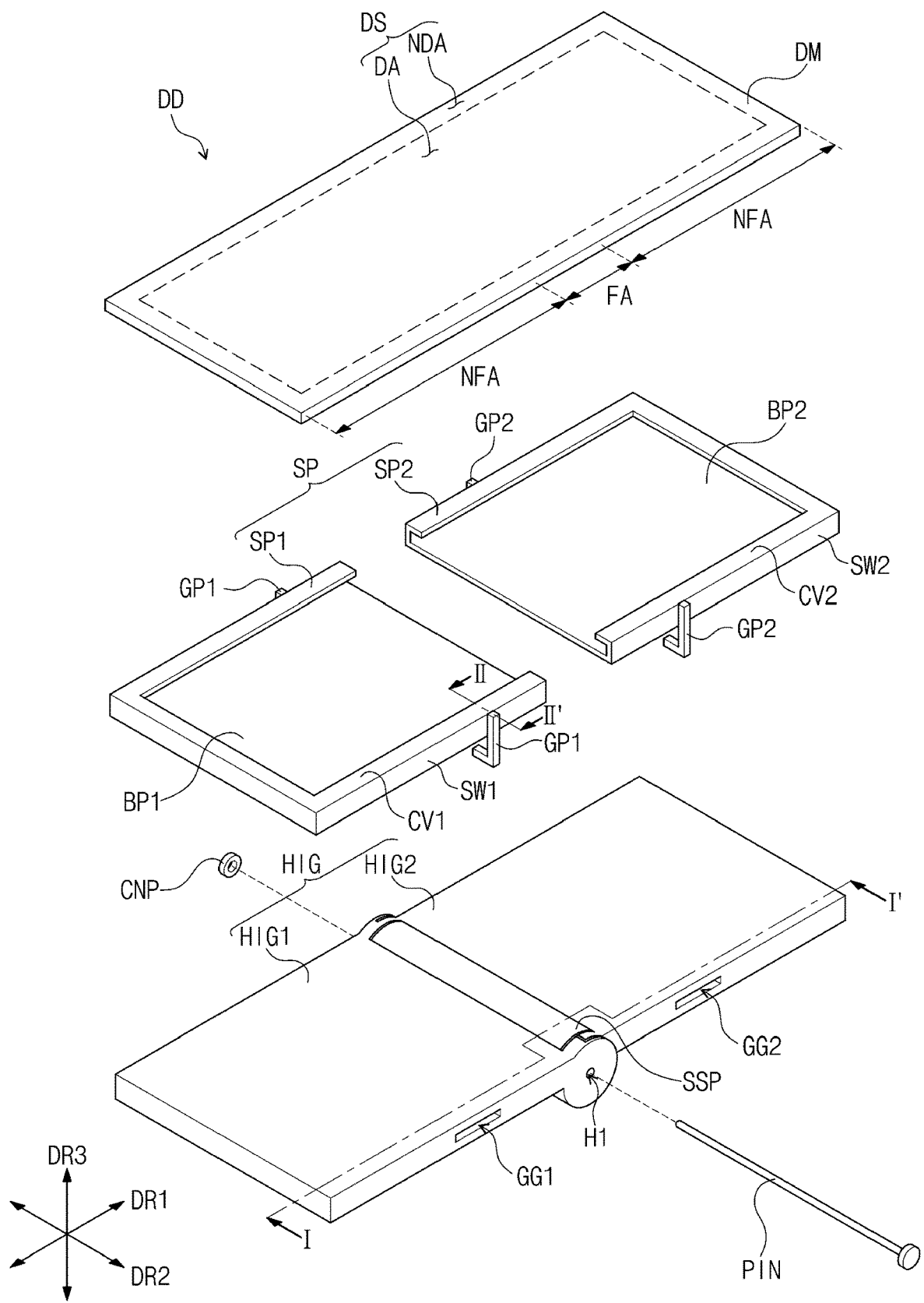
FIG. 8 is an exploded perspective view showing a display device according to an example embodiment of the present disclosure.

FIG. 8 is an exploded perspective view showing the display device DD according to an example embodiment of the present disclosure.

Referring to FIG. 8, the display device DD according to the example embodiment of the present disclosure may include the display module DM, a supporter SP disposed under the display module DM, a hinge HIG disposed under the supporter SP, a plurality of guide portions GP1 and GP2 connected to the supporter SP, a pin unit PIN connected to the hinge HIG, and a sub-supporter SSP.

The supporter SP may be disposed between the display module DM and the hinge HIG to support the display module DM. The supporter SP may include a first supporter SP1 and a second supporter SP2, which are arranged with each other in the first direction DR1 and respectively overlap with the adjacent non-folding areas NFA. The first and second supporters SP1 and SP2 may support the non-folding areas NFA, respectively.

The first supporter SP1 may include a first bottom portion BP1, a first sidewall portion SW1, and a first cover portion CV1. The first bottom portion BP1 may include a plane surface defined by the first and second directions DR1 and DR2. The first sidewall portion SW1 may extend upward from the sides of the first bottom portion BP1 except for one side of the first bottom portion BP1. The first cover portion CV1 may extend from the first sidewall portion SW1 to be substantially parallel to the first bottom portion BP1.

The second supporter SP2 may include a second bottom portion BP2, a second sidewall portion SW2, and a second cover portion CV2. The second bottom portion BP2 may include a plane surface defined by the first and second directions DR1 and DR2. The second sidewall portion SW2 may extend upward from the sides of the second bottom portion BP2 except for one side of the second bottom portion BP2. The second cover portion CV2 may extend from the second sidewall portion SW2 to be substantially parallel to the second bottom portion BP2. The one side of the first bottom portion BP1 (without the first sidewall portion SW1) may face the one side of the second bottom portion BP2 (without the second sidewall portion SW2).

The display module DM may be disposed on the first and second bottom portions BP1 and BP2. Edges of the display module DM may be inserted into a space defined by the first bottom portion BP1, the first sidewall portion SW1, and the first cover portion CV1 and a space defined by the second bottom portion BP2, the second sidewall portion SW2, and the second cover portion CV2. This structure will be shown in more detail in FIGS. 9 and 10.

The hinge HIG may be disposed under the display module DM and may fold the display module DM with respect to the folding area FA. The hinge HIG may include a first hinge HIG1 disposed under the first supporter SP1 and a second hinge HIG2 disposed under the second supporter SP2.

The first hinge HIG1 and the second hinge HIG2 may be coupled to rotate with respect to each other. One side of the first hinge HIG1 may be connected to one side of the second hinge HIG2 adjacent to the one side of the first hinge HIG1. The one sides of the first and second hinges HIG1 and HIG2, which are connected to each other, may rotate with respect to the folding axis FX.

The sub-supporter SSP may be disposed between the first hinge HIG1 and the second hinge HIG2. The sub-supporter SSP may overlap with the folding area FA. A predetermined or set space may be defined between a predetermined or set portion of the one side of the first hinge HIG1 and a predetermined or set portion of the one side of the second hinge HIG2 to accommodate the sub-supporter SSP.

The pin unit PIN may extend in the second direction DR2. The pin unit PIN may be inserted into the one side of the first hinge HIG1 and the one side of the second hinge HIG2 to connect the first hinge HIG1 and the second hinge HIG2. A first hole H1, into which the pin unit PIN is inserted, may be defined in each of the one side of the first hinge HIG1 and the one side of the second hinge HIG2.

The pin unit PIN may be inserted into the one side of the first hinge HIG1 and the one side of the second hinge HIG2, and a connection portion CNP may be connected to an end of the pin unit PIN. The pin unit PIN may define the folding axis FX. Substantially, the first and second hinges HIG1 and HIG2 may rotate with respect to the pin unit PIN.

The guide portions GP1 and GP2 are connected to the first and second supporters SP1 and SP2 and may extend downward to be inserted into a plurality of guide grooves GG1 and GG2 defined in the first and second hinges HIG1 and HIG2. The guide grooves GG1 and GG2 may extend (e.g., may be elongated) in the first direction DR1, and the guide portions GP1 and GP2 may move along (e.g., inside) the guide grooves GG1 and GG2.

In the example embodiment of the present disclosure, the guide portions GP1 and GP2 may be connected to the first and second supporters SP1 and SP2 after being separately manufactured, however, they should not be limited thereto or thereby. The guide portions GP1 and GP2 may be integrally formed with the first and second supporters SP1 and SP2 and may be defined in a protruding shape.

The guide portions GP1 and GP2 may include a plurality of first guide portions GP1 connected to the first supporter SP1 and a plurality of second guide portions GP2 connected to the second supporter SP2. The first guide portions GP1 may be connected to both sides of the first supporter SP1, which face oppositely away from each other in the second direction DR2. The second guide portions GP2 may be connected to both sides of the second supporter SP2, which face oppositely away from each other in the second direction DR2.

As an example, two first guide portions GP1 and two second guide portions GP2 are shown, however, the number of each of the first and second guide portions GP1 and GP2 should not be limited thereto or thereby.

The guide grooves GG1 and GG2 may include a plurality of first guide grooves GG1 defined in the first hinge HIG1 and a plurality of second guide grooves GG2 defined in the second hinge HIG2.

The first guide grooves GG1 may be defined in both side surfaces of the first hinge HIG1, which face oppositely away from each other in the second direction DR2. In FIG. 8, one first guide groove GG1 defined in one side surface of the first hinge HIG1 is shown due to a viewing direction of the perspective view, however, the first guide groove GG1 may also be defined in the other side surface of the first hinge HIG1.

The second guide grooves GG2 may be defined in both side surfaces of the second hinge HIG2, which face oppositely away from each other in the second direction DR2. In FIG. 8, one second guide groove GG2 defined in one side surface of the second hinge HIG2 is shown due to the viewing direction of the perspective view, however, the second guide groove GG2 may also be defined in the other side surface of the second hinge HIG2.

As an example, two first guide grooves GG1 and two second guide grooves GG2 have been described, however, the number of each of the first and second guide grooves GG1 and GG2 should not be limited to two. For example, the number of the first and second guide grooves GG1 and GG2 may vary depending on the number of the first and second guide portions GP1 and GP2.

The first guide portions GP1 may extend downwardly (along the third direction DR3) to be inserted into the respective first guide grooves GG1. The second guide portions GP2 may extend downwardly to be respectively inserted into the second guide grooves GG2.

Figure 9:
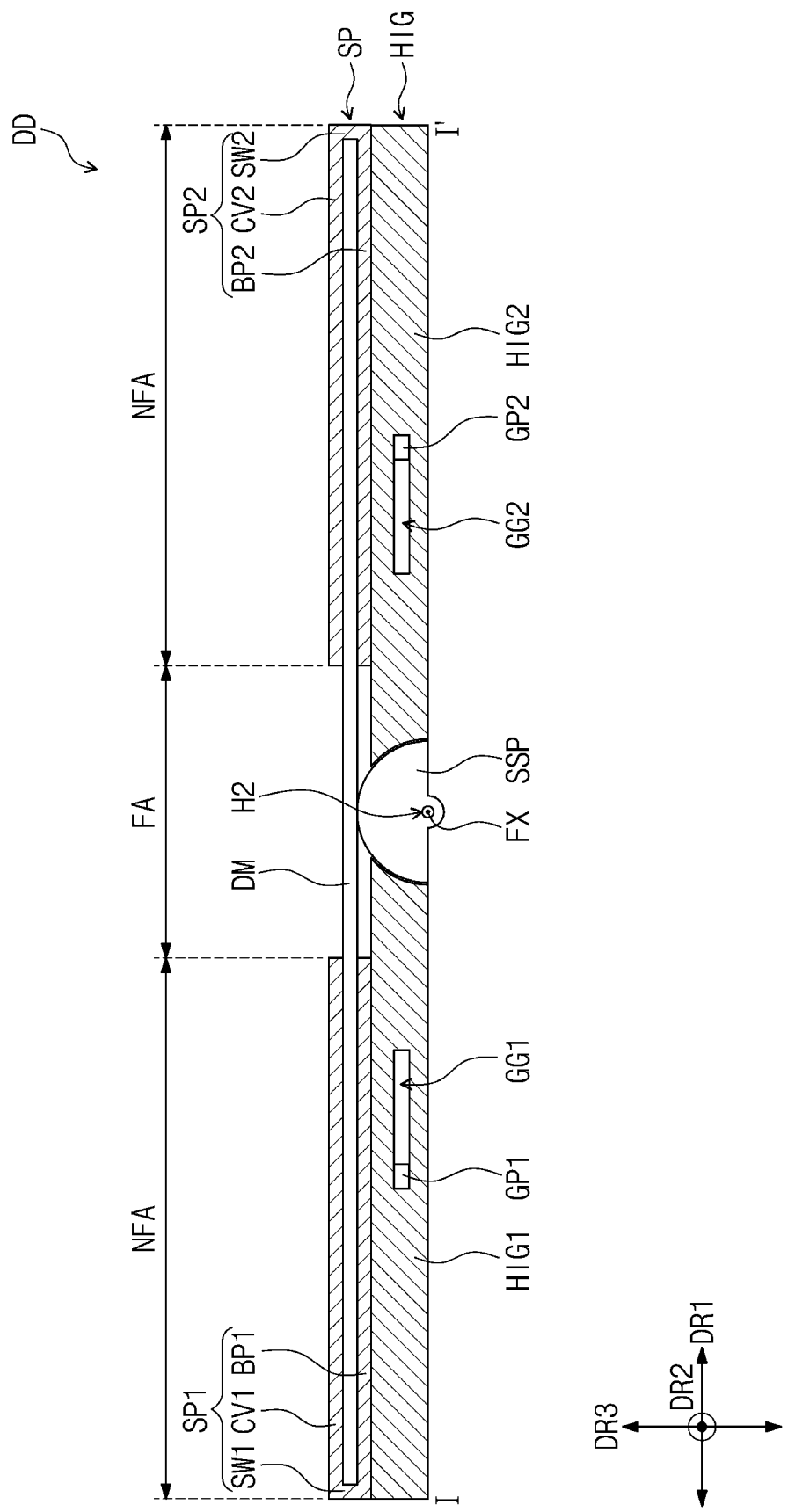
FIG. 9 is a cross-sectional view taken along a line I-I' shown in FIG. 8.
Figure 10:
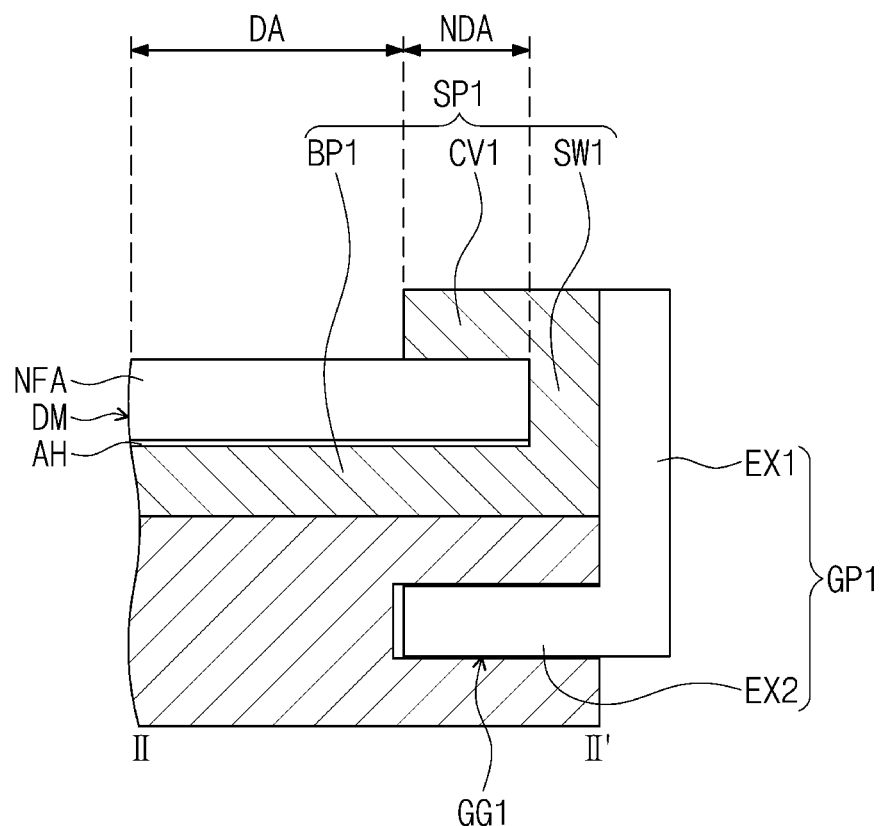
FIG. 10 is a cross-sectional view taken along a line II-II' shown in FIG. 8.

FIG. 9 is a cross-sectional view taken along a line I-I' shown in FIG. 8. FIG. 10 is a cross-sectional view taken along a line II-II' shown in FIG. 8.

FIGS. 9 and 10 show cross-sections of the display device DD in a state in which the display module DM, the supporter SP, and the hinge HIG are connected to each other.

Referring to FIG. 9, the first and second supporters SP1 and SP2 may be disposed on the first and second hinges HIG1 and HIG2, respectively, and the display module DM may be disposed on the first and second supporters SP1 and SP2.

The non-folding areas NFA may be disposed on the first and second bottom portions BP1 and BP2, respectively. The supporter SP may overlap with the edge of the display module DM to cover edges of the non-folding areas NFA. For example, the first and second supporters SP1 and SP2 may cover the edges of the non-folding areas NFA. The edges of the non-folding areas NFA may be defined as sides of the non-folding areas NFA except for a boundary between the folding area FA and the non-folding areas NFA.

In some embodiments, the edges of the non-folding areas NFA may be inserted into the space defined by the first bottom portion BP1, the first sidewall portion SW1, and the first cover portion CV1 and the space defined by the second bottom portion BP2, the second sidewall portion SW2, and the second cover portion CV2. Accordingly, the first and second sidewall portions SW1 and SW2 and the first and second cover portions CV1 and CV2 may cover the edges of the non-folding areas NFA.

The sub-supporter SSP may be disposed between a portion of the first hinge HIG1 and a portion of the second hinge HIG2. The sub-supporter SSP may be disposed under the folding area FA and may have a semi-circular shaped curved surface when viewed in the second direction DR2. The semi-circular shaped curved surface of the sub-supporter SSP may be disposed to face the folding area FA.

A second hole H2 may be defined through a center of a lower end (e.g., lower portion) of the sub-supporter SSP. The second hole H2 may overlap with the first hole H1 shown in FIG. 8. The pin unit PIN may be inserted into the first hole H1 and the second hole H2. Therefore, the sub-supporter SSP may be connected to the first and second hinges HIG1 and HIG2 by the pin unit PIN. The second hole H2 may extend in the second direction DR2, and the folding axis FX may overlap with the second hole H2.

The first and second guide portions GP1 and GP2 may be respectively disposed in the first and second guide grooves GG1 and GG2. The first and second guide portions GP1 and GP2 may move back and forth in the first direction DR1 along (e.g., inside) the first and second guide grooves GG1 and GG2. This movement will be described in more detail below.

Referring to FIG. 10, the first guide portion GP1 may include a first extension portion EX1 extending in the third direction DR3 and a second extension portion EX2 extending in the second direction DR2 from a lower end of the first extension portion EX1. The first extension portion EX1 may be connected to the first supporter SP1. In more detail, the first extension portion EX1 may be connected to the first sidewall portion SW1. The second extension portion EX2 may be inserted into the first guide groove GG1.

The second guide portion GP2 may have the same configuration as the first guide portion GP1. For example, the second guide portion GP2 may include a first extension portion EX1 connected to the second supporter SP2 and extending in the third direction DR3 and a second extension portion EX2 extending from a lower end of the first extension portion EX1 and inserted into the second guide groove GG2.

Hereinafter, in the descriptions of FIG. 10, the non-folding area NFA disposed in the first supporter SP1 will be referred to as a "first non-folding area", and the non-folding area NFA disposed in the second supporter SP2 will be referred to as a "second non-folding area".

The first sidewall portion SW1 may be disposed on (e.g., adjacent to) a side surface of the first non-folding area. The first cover portion CV1 may be disposed on the non-display area NDA of the first non-folding area. The second sidewall portion SW2 may be disposed on (e.g., adjacent to) a side surface of the second non-folding area, and the second cover portion CV2 may be disposed on the non-display area NDA of the second non-folding area.

The non-folding areas NFA may be attached to the supporter SP. As an example, an adhesive AH may be disposed between the first non-folding area and the first bottom portion BP1. The first non-folding area may be attached to the first bottom portion BP1 by the adhesive AH. The first non-folding area may not be attached to the first cover portion CV1.

The adhesive AH may be disposed between the second non-folding area and the second bottom portion BP2 to attach the second non-folding area to the second bottom portion BP2. The second non-folding area may not be attached to the second cover portion CV2. Accordingly, the non-folding areas NFA may be fixed to the first and second bottom portions BP1 and BP2 and may not be fixed to the first and second cover portions CV1 and CV2.

For the convenience of explanation, the adhesive AH is not shown in FIG. 9. In addition, the first and second guide portions GP1 and GP2 respectively disposed in the first and second guide grooves GG1 and GG2 shown in FIG. 9 may respectively be the second extension portions EX2.

Figure 11:
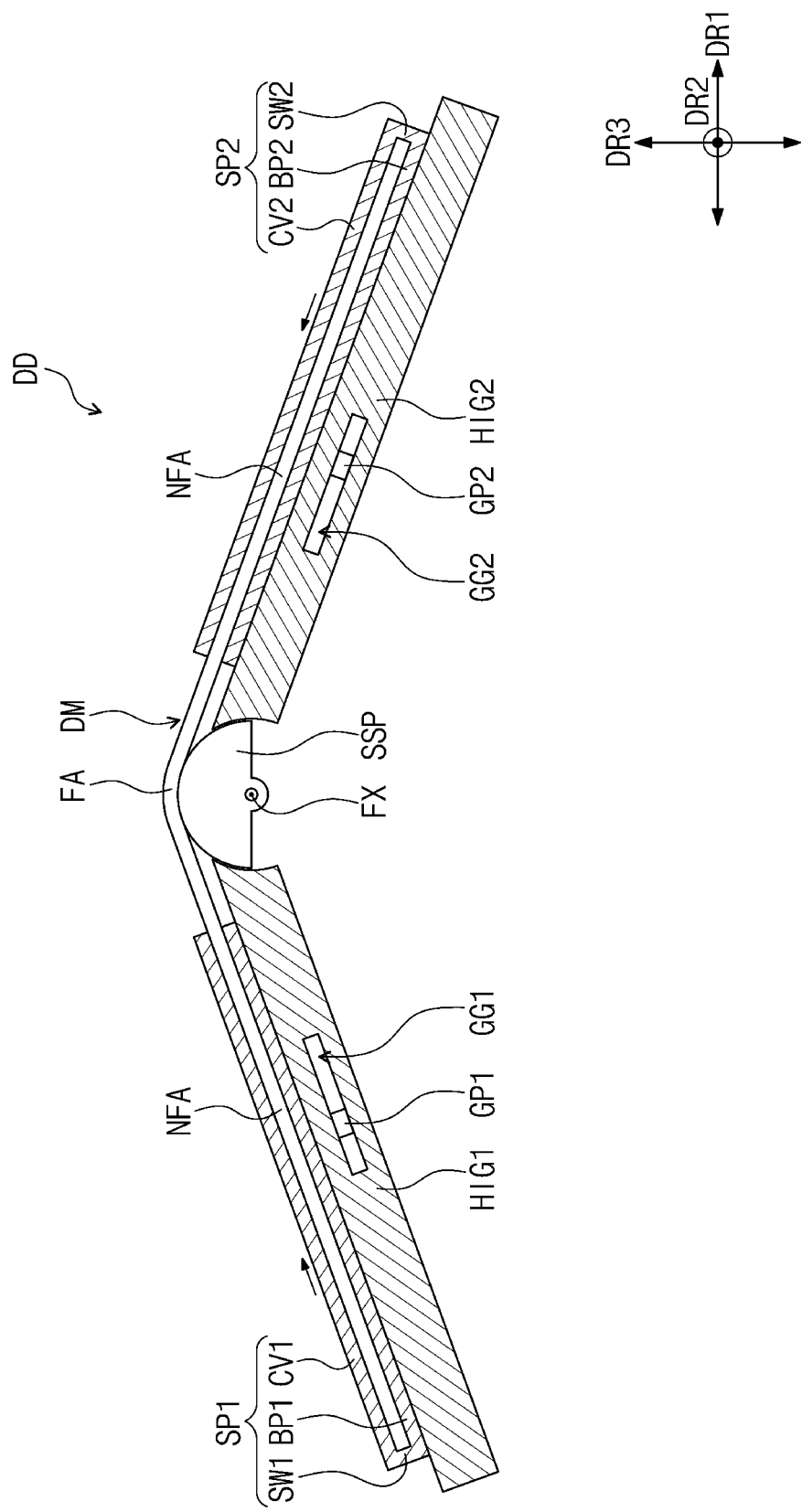
FIGS. 11 and 12 are views showing a folding operation of a display device shown in FIG. 9.
Figure 12:
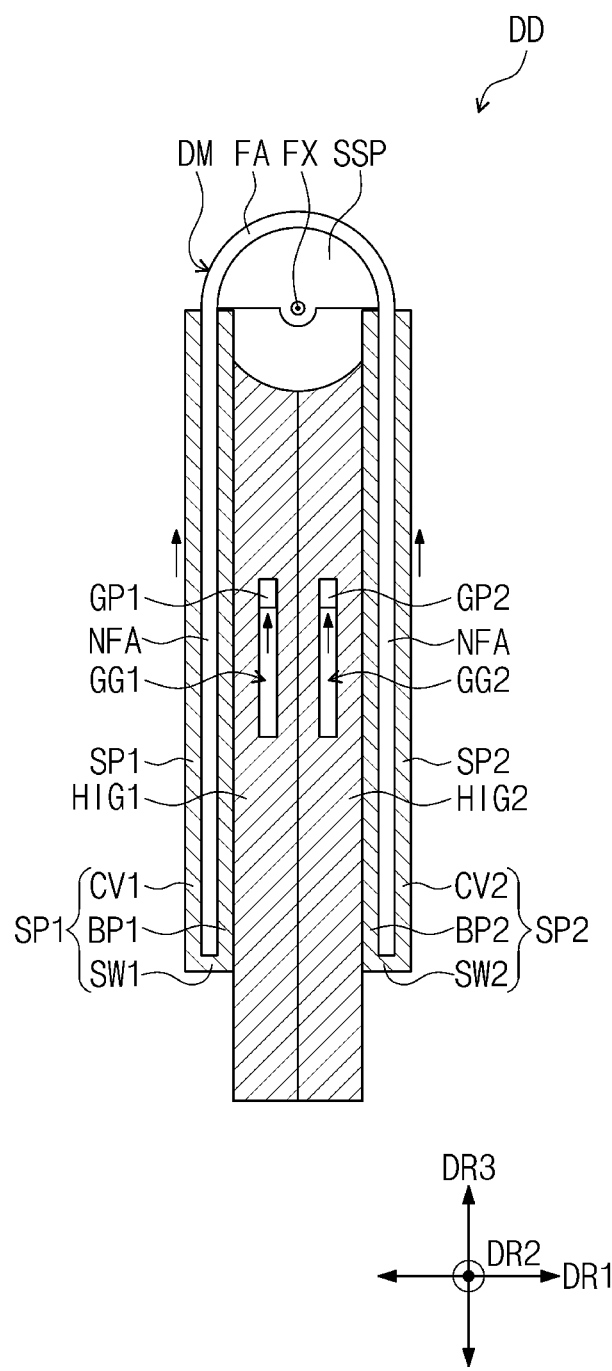

FIGS. 11 and 12 are views showing a folding operation of the display device shown in FIG. 9.

Referring to FIGS. 11 and 12, the display device DD may rotate with respect to the folding axis FX to be folded. As an example, the first hinge HIG1 may rotate in a counter-clockwise direction with respect to the folding axis FX, and the second hinge HIG2 may rotate in a clockwise direction with respect to the folding axis FX.

When the first and second hinges HIG1 and HIG2 rotate with respect to the folding axis FX, the folding area FA may be folded, and thus the display module DM may be folded. The display module DM may be outwardly folded by the first and second hinges HIG1 and HIG2 such that the display module DM is exposed to the outside. A state in which the display device DD is completely folded may correspond to a state obtained when each of the first and second hinges HIG1 and HIG2 rotates at an angle of about 90 degrees as shown in FIG. 12.

When the display device DD is folded, the first supporter SP1 and the second supporter SP2 may respectively slide (e.g., move) on the first hinge HIG1 and the second hinge HIG2. When the display device DD is outwardly folded, the first and second supporters SP1 and SP2 may move toward the center of the display device DD relative to the first and second hinges HIG1 and HIG2.

The first and second supporters SP1 and SP2 may move by the first and second guide portions GP1 and GP2. As an example, since the first guide portion GP1 connected to the first supporter SP1 moves toward the center of the display device DD along the first guide groove GG1, the first supporter SP1 may move accordingly. Since the second guide portion GP2 connected to the second supporter SP2 moves toward the center of the display device DD along the second guide groove GG2, the second supporter SP2 may move accordingly.

When the display device DD is unfolded, the first guide portion GP1 may be disposed at one side of the first guide groove GG1, and when the display device DD is folded, the first guide portion GP1 may move (along the elongation direction of the first guide groove GG1) and may be disposed at the other side of the first guide groove GG1 as shown in FIG. 12. The one side of the first guide groove GG1 may be more spaced apart (e.g., spaced apart further) from the folding axis FX than the other side of the first guide groove GG1.

When the display device DD is unfolded, the second guide portion GP2 may be disposed at one side of the second guide groove GG2, and when the display device DD is folded, the second guide portion GP2 may move (along the elongation direction of the first guide groove GG1) and may be disposed at the other side of the second guide groove GG2 as shown in FIG. 12. The one side of the second guide groove GG2 may be more spaced apart (e.g., spaced apart further) from the folding axis FX than the other side of the second guide groove GG2.

When the display module DM is folded, the folding area FA may have a curved shape. When the display module DM is folded, the folding area FA may make contact with the sub-supporter SSP and may be supported by the sub-supporter SSP. The folding area FA may be disposed on the sub-supporter SSP having the semi-circular shaped curved surface, and thus the folding area FA may have a semi-circular shape. The folding area FA may easily maintain the semi-circular shape by the sub-supporter SSP.

Since the non-folding areas NFA are supported by the first and second bottom portions BP1 and BP2, the first and second sidewall portions SW1 and SW2, and the first and second cover portions CV1 and CV2, the non-folding areas NFA may easily hold the flat state.

When the display module DM is folded, an upper surface of the folding area FA may be stretched more than a lower surface of the folding area FA. In a case where the display module DM is attached and fixed to the first and second cover portions CV1 and CV2, a stress may occur on the upper surface of the folding area FA while the display module DM is folded that may prevent the upper surface of the folding area FA from being stretched. The stress may interfere with the folding operation of the display module DM.

In the example embodiments of the present disclosure, because the display module DM is not attached to the first and second cover portions CV1 and CV2, the stress on the upper surface of the folding area FA does not occur (or does not substantially occur), and thus the folding operation of the display module DM may be easily performed.

Each of the first and second guide grooves GG1 and GG2 may have a length determined in accordance with a length of an arc of the folding area FA when the display module DM is folded. This structure will be described in more detail below.

Figure 15:
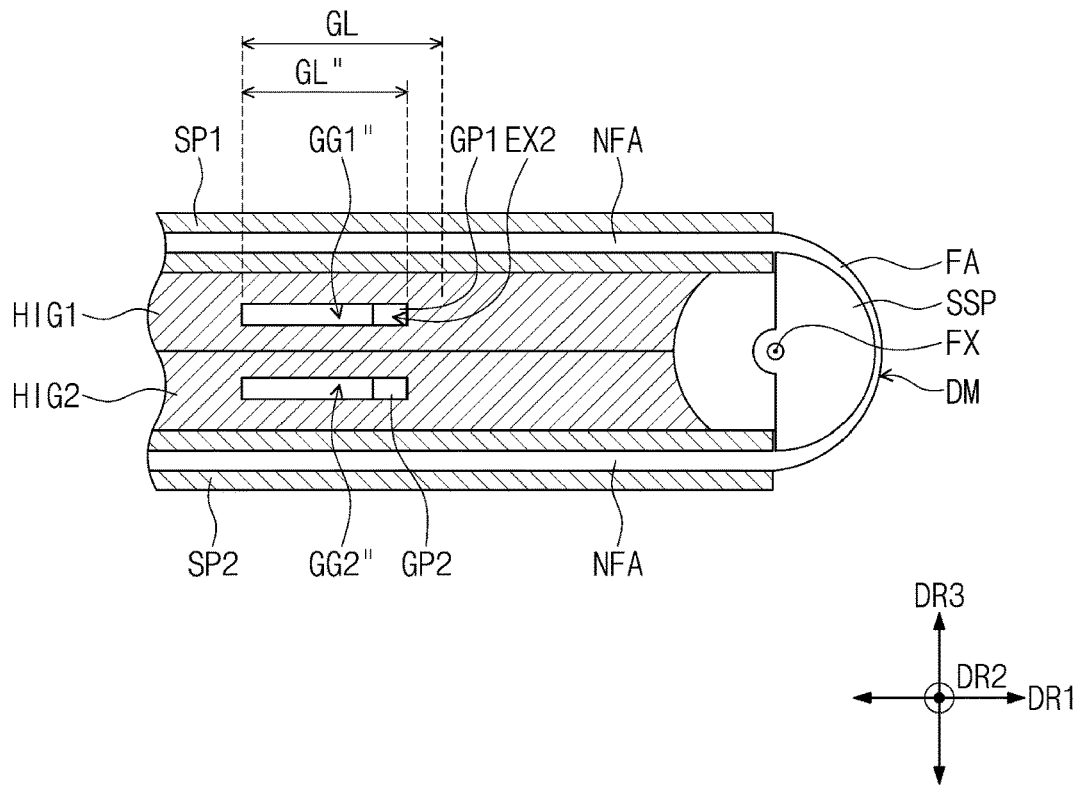

FIG. 13 is an enlarged view showing the folding area FA shown in FIG. 12. FIGS. 14 and 15 are views showing first and second guide grooves GG1 and GG2 having a length different from that of the first and second guide grooves GG1 and GG2 shown in FIG. 13.

Referring to FIG. 13, the folding area FA may be changed (e.g., by folding) to the semi-circular shape, and the folding area FA having the semi-circular shape may have an inner side surface that is not exposed to the outside and has a concave shape and an external side surface that is exposed to the outside and has a convex shape. When the folding area FA is unfolded, the inner side surface may be the lower surface of the folding area FA, and the outer side surface may be the upper surface of the folding area FA.

The arc CA of the folding area FA may be defined in a predetermined (or set) portion between the inner side surface and the outer side surface. For the convenience of explanation, the arc CA of the folding area FA is indicated by a dotted line in FIG. 13. The arc CA of the folding area FA may have a length L corresponding to a value obtained by multiplying a radius R, which is defined as a distance from the folding axis FX to the arc CA, by pi ($\pi$).

As an example, the display module DM may have a thickness of about 1 mm. The thickness of the display module DM may be measured in the third direction DR3. The arc CA may be defined in a portion of the folding area FA spaced apart from the inner side surface of the folding area FA by about 300 μm to about 500 μm, and in some embodiments may be defined in a portion of the folding area FA spaced apart from the inner side surface of the folding area FA by about 400 μm.

The length GL of each of the first and second guide grooves GG1 and GG2 may be determined by the length L of the arc CA. The length GL of the first guide groove GG1 may be substantially the same as the length GL of the second guide groove GG2. Hereinafter, the length GL of the first guide groove GG1 will be described as a representative example, and detailed descriptions of the length GL of the second guide groove GG1 will not be provided.

The length GL of the first guide groove GG1 may be determined (calculated) by dividing the length L of the arc by 2 and adding the obtained value to a width W of the first guide portion GP1 disposed in the first guide groove GG1. For example, the length GL of the first guide groove GG1 may be obtained utilizing the following Equation 1. The length GL of the second guide groove GG2 may be also obtained utilizing the following Equation 1.

$$GL=L/2+W. \quad \text{Equation 1}$$

The width W of the first guide portion GP1 may be a value measured with respect to the first direction DR1 and may correspond to a width (in the first direction DR1) of the second extension portion EX2 of the first guide portion GP1. The second extension portion EX2 may move along the first guide groove GG1, and a maximum movement amount (e.g., maximum movement distance) of the second extension portion EX2 may be determined as L/2 that is a half value of the length L of the arc CA. Accordingly, a sum of the maximum movement amount of the first guide portion GP1 and the maximum movement amount of the second guide portion GP2 may correspond to the length L of the arc CA.

Referring to FIG. 14, when a length GL' of a first guide groove GG1' is longer than the length GL shown in FIG. 13, the second extension portion EX2 may further move toward the center of the display device. Thus, a maximum movement amount of the second extension portion EX2 may be greater than L/2 that is the half value of the length L of the arc CA. In this case, the folding area FA may be spaced apart from the sub-supporter SSP and may excessively move to an outer portion. Therefore, the folding area FA may not maintain the semi-circular shape and may be deformed to other shapes.

Referring to FIG. 15, when a length GL" of a first guide groove GG1" is shorter than the length GL shown in FIG. 13, the maximum movement amount of the second extension portion EX2 may be smaller than the L/2 that is the half value of the length L of the arc CA. In this case, because the amount of movement of the second extension portion EX2 is insufficient, the folding area FA may be pulled excessively after making contact with the sub-supporter SSP. Accordingly, the shape of the folding area FA may be deformed and may be damaged.

Referring to FIG. 13 again, when the length GL of each of the first and second guide grooves GG1 and GG2 is determined based on the length L of the arc CA in the example embodiments, the maximum movement amount of the second extension portion EX2 may be set to the L/2 that is the half value of the length L of the arc CA. As a result, the movement amount of each of the first and second guide portions GP1 and GP2 may be set or optimized to the L/2 that is the half value of the length L of the arc CA, and the shape of the folding area FA may be constantly maintained in the semi-circular shape, and thus the folding area FA may be prevented or protected from being damaged.

In a case where a position of the arc CA is determined with respect to the outer side surface of the folding area FA (e.g., where the arc CA lies on the outer side surface of the folding area FA), the length of the arc CA may become longer, and thus the length of the first guide groove GG1 may become longer. In a case where the position of the arc CA is determined with respect to the inner side surface of the folding area FA (e.g., where the arc CA lies on the inner side surface of the folding area FA), the length of the arc CA may become shorter, and thus the length of the first guide groove GG1 may become shorter. In these cases, similar to the folding areas FA shown in FIGS. 14 and 15, the folding area FA may be deformed and damaged.

However, in the example embodiment of the present disclosure, the arc CA is determined with respect to (is defined in) the predetermined (set) portion between the inner side surface and the outer side surface of the folding area FA, and as a result, the folding area FA may be constantly maintained in the semi-circular shape by the sub-supporter SSP.

In the example embodiment of the present disclosure, the maximum movement amount of each of the first and second guide portions GP1 and GP2 may be set to the L/2 by the first and second guide grooves GG1 and GG2. Because the display device DD of the present embodiments may provide the first and second guide grooves GG1 and GG2 having a length that is set or optimized in accordance with the length L of the arc CA of the folding area FA, the display device DD may maintain the shape of the folding area FA constantly, and may prevent or protect the folding area FA from being damaged.

As a representative example, the first and second guide portions GP1 and GP2 have been described, however, the present disclosure should not be limited thereto or thereby. For example, at least one guide portion may move while being inserted into one guide groove, and in this case, the maximum movement amount of the one guide portion may be set as the length L of the arc CA. Here, the length of the one guide groove may be determined or obtained by adding the length L of the arc CA to the width W of the guide portion.

The one guide portion may be connected to the first supporter SP1 and may be inserted into the first guide groove GG1 defined in the first hinge HIG1, however, it should not be limited thereto or thereby. That is, the one guide portion may be connected to the second supporter SP2 and may be inserted into the second guide groove GG2 defined in the second hinge HIG2.

As a representative example, the movement amount of the first and second guide portions GP1 and GP2, which is determined in accordance with the length of the first and second guide grooves GG1 and GG2 corresponding to the length L of the arc CA, has been described, however, the embodiment of the present disclosure should not be limited thereto or thereby. That is, the length of the first and second guide grooves GG1 and GG2 may be longer than "L/2+W", and a moving distance of each of the first and second guide portions GP1 and GP2 may be adjusted by a separate component.

For example, the length of the first and second guide grooves GG1 and GG2 may be longer than "L/2+W", and each of the first and second guide portions GP1 and GP2 may move a distance (set by a separate stopper, for example) that is smaller than the length of each of the first and second guide grooves GG1 and GG2. For example, the maximum moving distance of each of the first and second guide portions GP1 and GP2 may be set to L/2 by the stopper.

The user may freely set the moving distance of each of the first and second guide portions GP1 and GP2 to be smaller than the length (L/2+W) of each of the first and second guide grooves GG1 and GG2 by using the stopper formed in the groove.

Figure 16:
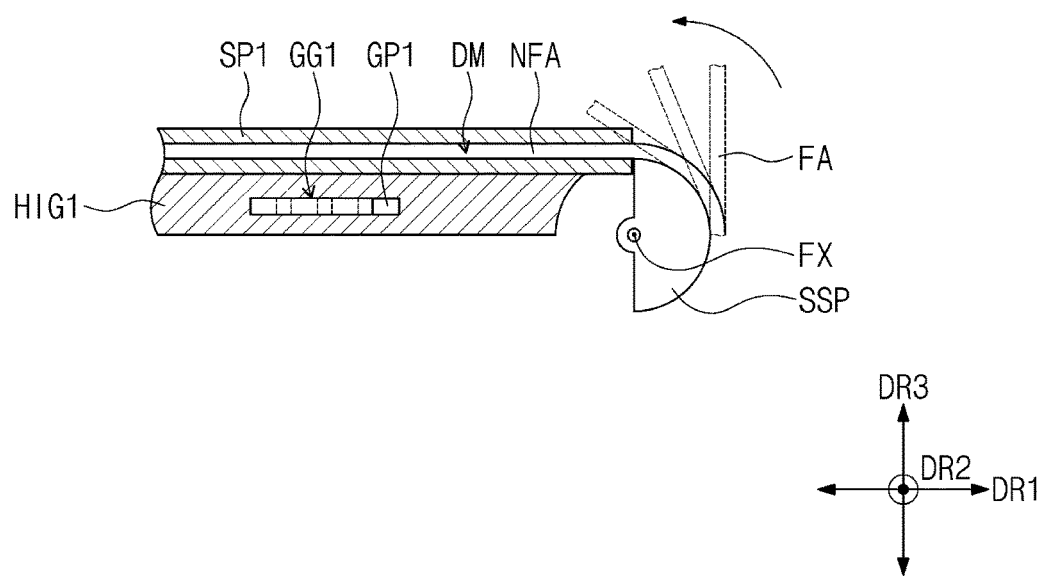
FIGS. 16 and 17 are views explaining an amount of movement of a first guide portion according to a folding operation of a display device of the present disclosure.
Figure 17:
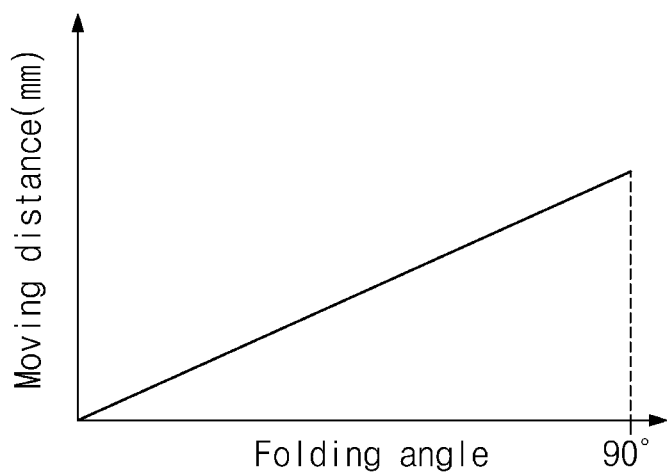

FIGS. 16 and 17 are views explaining an amount of movement of the first guide portion GP1 according to the folding operation of the display device of the present disclosure.

For the convenience of explanation, FIG. 16 shows the first hinge HIG1, the first supporter SP1, and the first guide portion GP1, whereas the second hinge HIG2, the second supporter SP2, and the second guide portion GP2 are not shown.

Referring to FIGS. 16 and 17, the first guide portion GP1 may move along the first guide groove GG1 due to the folding of the display module DM. As the folding angle of the display module DM increases, the movement amount of the first guide portion GP1 may increase. The movement amount of the first guide portion GP1 may be proportional to the folding angle of the display module DM.

As shown in FIG. 17, the movement amount of the first guide portion GP1 may be linearly proportional to the folding angle of the display module DM. Similarly, the movement amount of the second guide portion GP2 may be linearly proportional to the folding angle of the display module DM.

Figure 18:
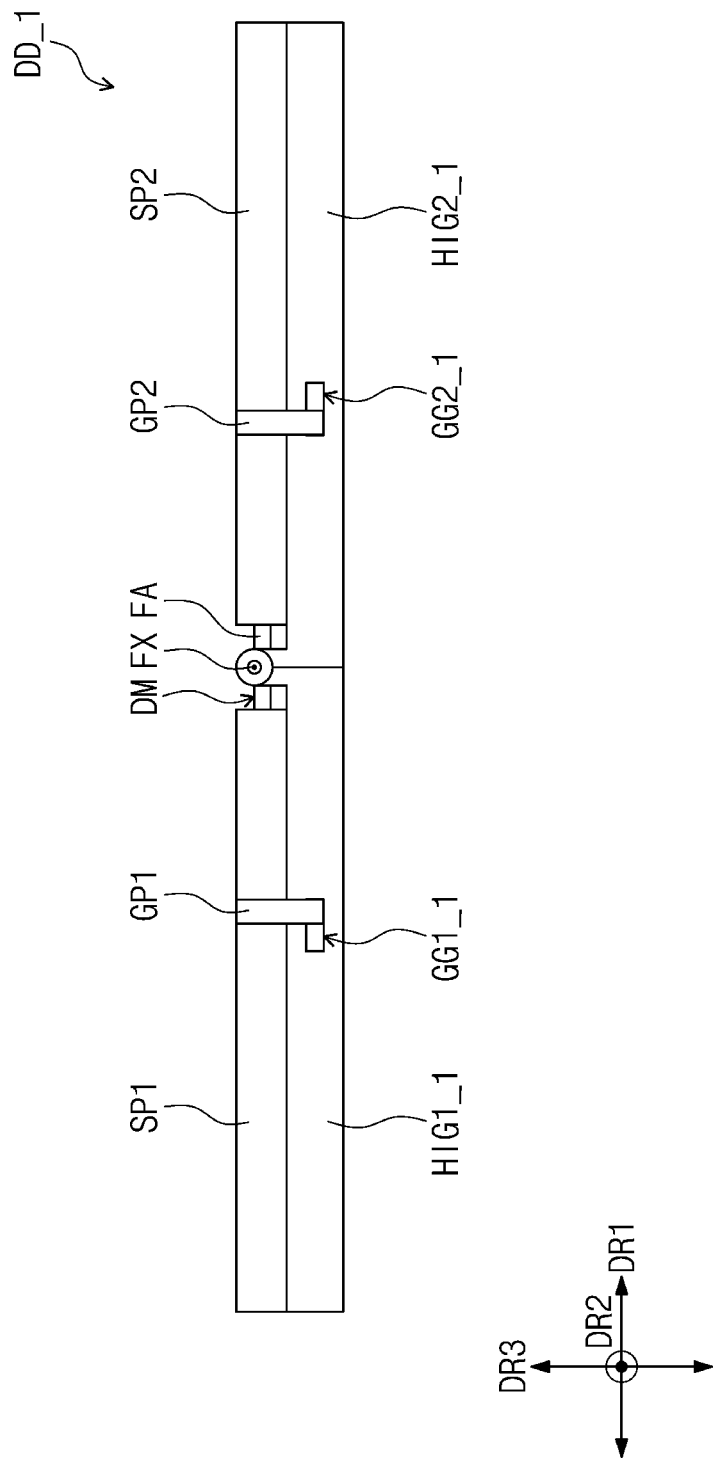
FIGS. 18 and 19 are views showing a configuration of a display device according to another embodiment of the present disclosure.
Figure 19:
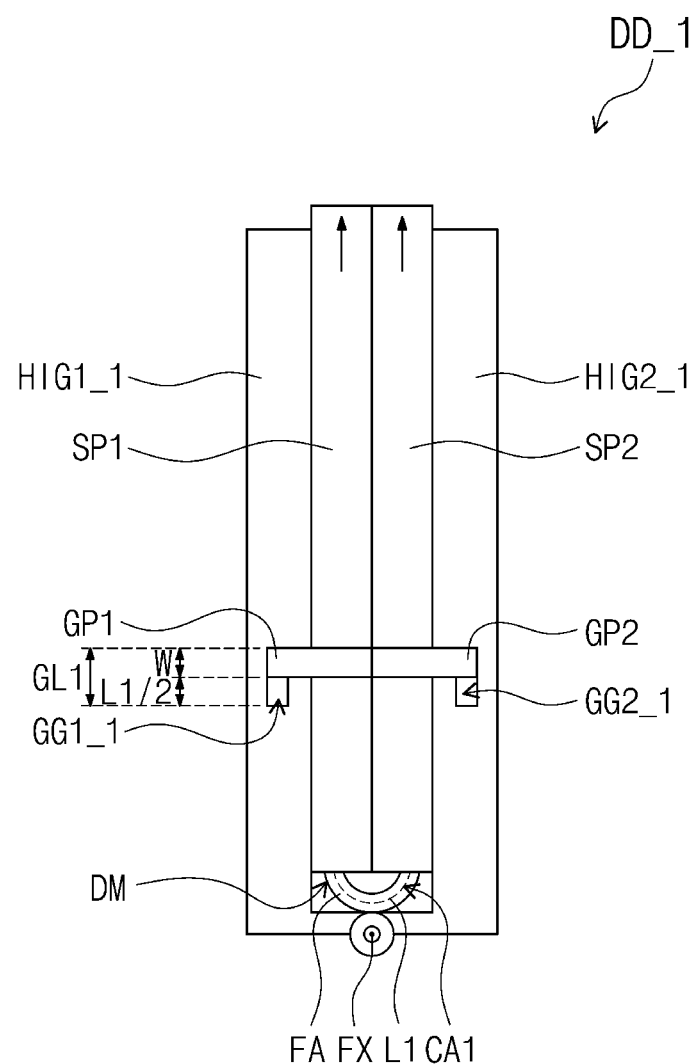

FIGS. 18 and 19 are views showing a configuration of a display device DD_1 according to another embodiment of the present disclosure.

For the convenience of explanation, FIGS. 18 and 19 show a side surface of the display device DD_1. The display device DD_1 may be inwardly folded such that a display module DM is not exposed to the outside, and other configurations of the display device DD_1 may be substantially the same as those of the display device DD. Accordingly, hereinafter, configurations of the display device DD_1, which are different from those of the display device DD, will be mainly described, and configurations that are the same as those in the display device DD are assigned with the same reference numerals.

Referring to FIG. 18, the display device DD_1 may include a first hinge HIG1_1 and a second hinge HIG2_1, which are connected to rotate with each other, to inwardly fold the display module DM. One side of the first hinge HIG1_1 and one side of the second hinge HIG2_1 may be connected to rotate with each other with respect to a folding axis FX. The folding axis FX may overlap with a folding area FA.

A first guide portion GP1 may be connected to a first supporter SP1 and may be inserted into a first guide groove GG1_1 defined in the first hinge HIG1_1. The first guide portion GP1 may be disposed at one side of the first guide groove GG1_1 adjacent to the folding axis FX.

A second guide portion GP2 may be connected to a second supporter SP2 and may be inserted into a second guide groove GG2_1 defined in the second hinge HIG2_1. The second guide portion GP2 may be disposed at one side of the second guide groove GG2_1 adjacent to the folding axis FX.

Referring to FIG. 19, the first hinge HIG1_1 and the second hinge HIG2_1 may rotate with respect to the folding axis FX, and the display module DM may be inwardly folded by the first and second hinges HIG1_1 and HIG2_1 such that the display module DM is not exposed to the outside. When the display module DM is folded, the first supporter SP1 and the second supporter SP2 may move (e.g., may be moved) by the first guide portion GP1 and the second guide portion GP2.

When the display module DM is folded, the first guide portion GP1 may move to be disposed at the other side of the first guide groove GG1_1, which is further spaced apart from the folding axis FX than the one side of the first guide groove GG1_1. When the display module DM is folded, the second guide portion GP2 may move to be disposed at the other side of the second guide groove GG2_1, which is further spaced apart from the folding axis FX than the one side of the second guide groove GG2_1.

A length GL1 of each of the first and second guide grooves GG1_1 and GG2_1 may be determined in the same manner as that of the first and second guide grooves GG1 and GG2. For example, the length GL1 of the first guide groove GG1_1 may be obtained by dividing a length L1 of an arc CA1 of the folding area FA by 2, and adding the obtained value to a width W of the first guide portion GP1 disposed in the first guide groove GG1_1. A length of the second guide groove GG2_1 may be equal to that of the first guide groove GG1_1.

Accordingly, the display device DD_1 according to another embodiment of the present disclosure may provide the first and second guide grooves GG1_1 and GG2_1 having the length set or optimized in accordance with the length L1 of the arc CA1 of the folding area FA, and thus the display device DD_1 may maintain the shape of the folding area FA constantly, and may prevent or reduce the folding area FA from being damaged.

Figure 20:
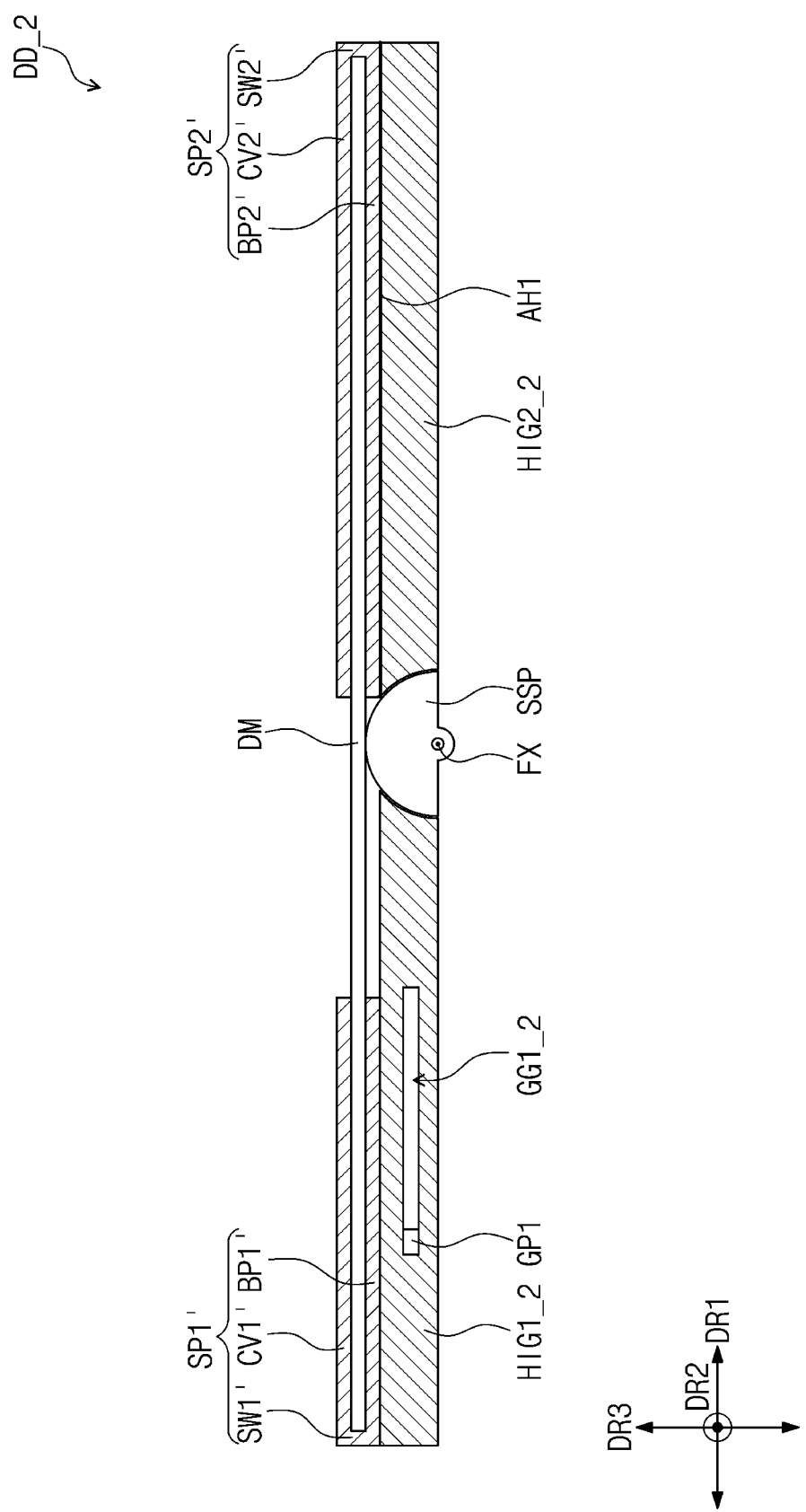
FIGS. 20 and 21 are views showing a configuration of a display device according to another embodiment of the present disclosure.
Figure 21:
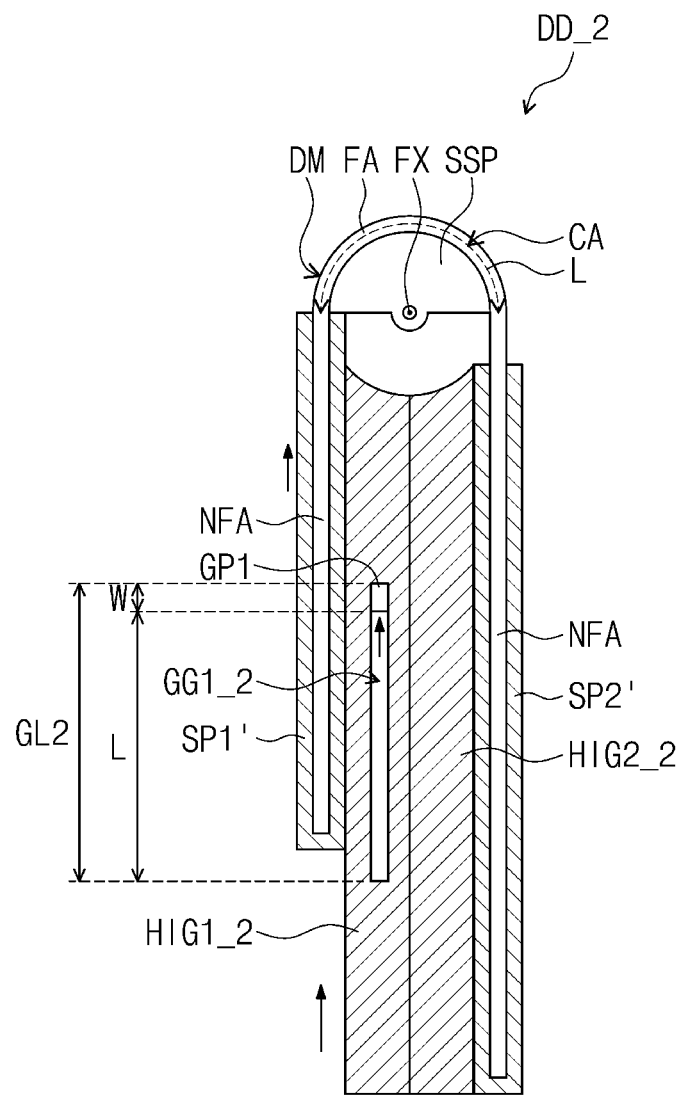

FIGS. 20 and 21 are views showing a configuration of a display device DD_2 according to another embodiment of the present disclosure.

For the convenience of explanation, FIGS. 20 and 21 show a cross section of the same portion of a device as that shown in FIGS. 9 and 12, respectively. Hereinafter, configurations of the display device DD_2, which are different from those of the display device DD, will be mainly described, and configurations that are the same as those of the display device DD are assigned with the same reference numerals.

Referring to FIG. 20, a first guide groove GG1_2 may be defined in a first hinge HIG1_2, and a guide groove may not be defined in a second hinge HIG2_2. A first guide portion GP1 may be connected to a first supporter SP1' and may be inserted into the first guide groove GG1_2. A guide portion may not be disposed on the second supporter SP2'.

When the display device DD_2 is unfolded, the first supporter SP1' may be spaced apart from a sub-supporter SSP. The second supporter SP2' may be disposed adjacent to (or near) the sub-supporter SSP. For example, a first bottom portion BP1', a first sidewall portion SW1', and a first cover portion CV1' may be spaced apart from the sub-supporter SSP by a predetermined (or set) interval. A second bottom portion BP2', a second sidewall portion SW2', and a second cover portion CV2' may be disposed adjacent to (or near) the sub-supporter SSP.

The second supporter SP2' may be disposed on and attached to the second hinge HIG2_2. As an example, an adhesive AH1 may be disposed between the second supporter SP2' and the second hinge HIG2_2, and the second supporter SP2' may be attached and fixed to the second hinge HIG2_2 by the adhesive AH1.

Referring to FIG. 21, the first and second hinges HIG1_2 and HIG2_2 may rotate with respect to the folding axis FX, and the display module DM may be folded. Because the first supporter SP1' is fixed to the first hinge HIG1_2, the first supporter SP1' may move. The first guide portion GP1 moves along the first guide groove GG1_2, and thus the first supporter SP1' may move.

A length GL2 of the first guide groove GG1_2 may be determined by a length L of an arc CA of the folding area FA. The length GL2 of the first guide groove GG1_2 may be a value obtained by adding the length L of the arc CA to a width W of the first guide portion GP1 disposed in the first guide groove GG1_2. As an example, the length GL2 of the first guide groove GG1_2 may be obtained utilizing the following Equation 2:

$$GL2 = L + W. \quad \text{Equation 2}$$

Unlike in the display device DD, the first guide groove GG1_2 is disposed only in the first hinge HIG1_2 in the display device DD_2, and thus the length GL2 of the first guide groove GG1_2 may be longer than the length GL of the first guide groove GG1. Accordingly, the display device DD_2 may provide the first guide groove GG1_2 having the length optimized in accordance with the length L of the arc CA of the folding area FA.

Figure 22:
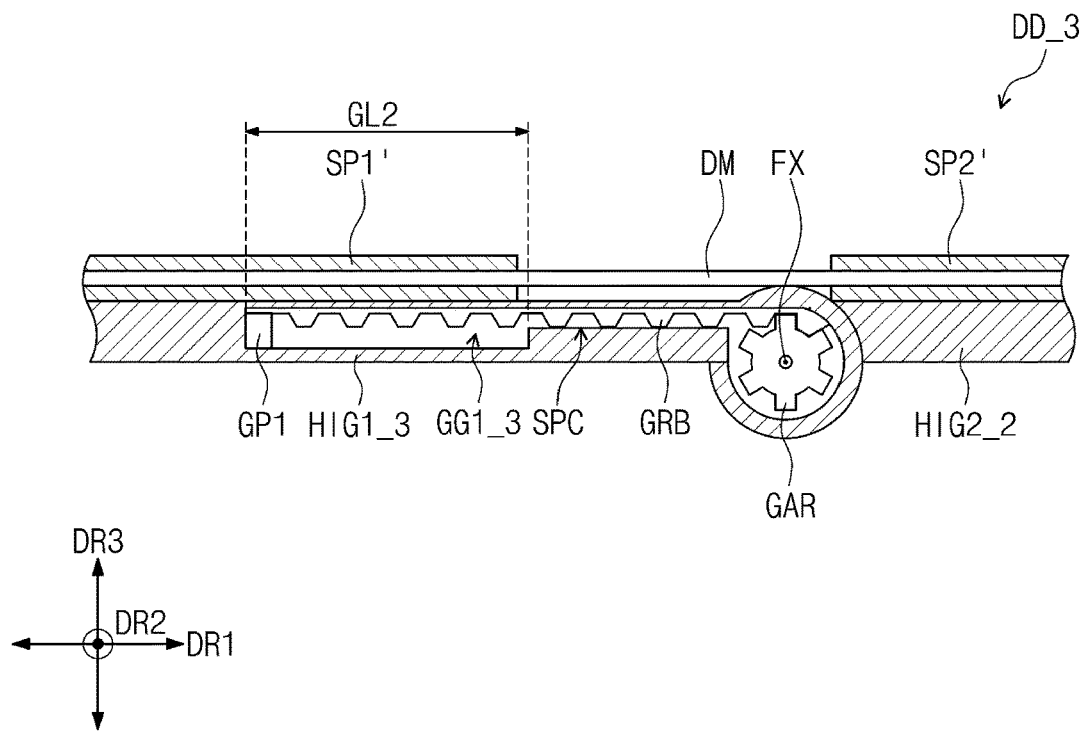
FIGS. 22 and 23 are views showing a configuration of a display device according to another embodiment of the present disclosure.
Figure 23:
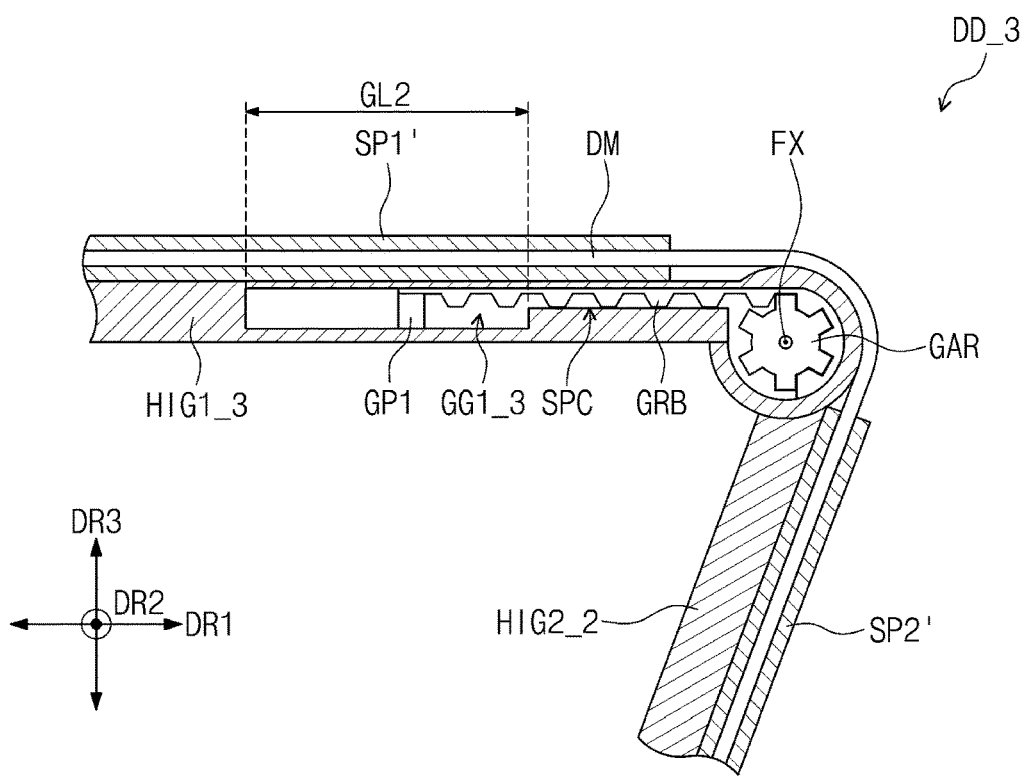

FIGS. 22 and 23 are views showing a configuration of a display device DD_3 according to another embodiment of the present disclosure.

For the convenience of explanation, FIGS. 22 and 23 show a cross section of the same portion of a device as that shown in FIGS. 20 and 21, respectively. Configurations of the display device DD_3 may be substantially the same as those of the display device DD_2 shown in FIGS. 20 and 21 except for a gear GAR and a gear belt GRB. Accordingly, the gear GAR and the gear belt GRB will be mainly described, and configurations that are the same as those of the display device DD_2 are assigned with the same reference numerals.

Referring to FIG. 22, the display device DD_3 may include the gear GAR disposed at one side of a first hinge HIG1_3 and the gear belt GRB connected to the gear GAR. A center of the gear GAR may overlap with the folding axis FX and may be connected to the pin unit PIN shown in FIG. 8.

The gear belt GRB may be disposed in a first guide groove GG1_3. The first guide groove GG1_3 may have the same length as the length GL2 of the first guide groove GG1_2. The gear belt GRB may be connected to the first guide portion GP1 and may extend in the first direction DR1 to be disposed above the gear GAR. One side of the gear belt GRB may be connected to the first guide portion GP1, and the other side of the gear belt GRB may be disposed above the gear GAR.

A space SPC in which the gear belt GRB and the gear GAR are disposed may be defined in the first hinge HIG1_3. The space SPC may extend in the first direction DR1 from the first guide groove GG1_3 to the one side of the first hinge HIG1_3. A size (height) of the space SPC may be smaller than the first guide groove GG1_3 with respect to the third direction DR3.

The gear belt GRB may be engaged with the gear GAR. For example, protrusions of the gear belt GRB may be engaged with grooves of the gear GAR. In addition, protrusions of the gear GAR may be engaged with grooves of the gear belt GRB. Accordingly, when the gear GAR rotates, the gear belt GRB may move along the gear GAR. As an example, the protrusions of the gear belt GRB may be disposed to face downward.

Referring to FIG. 23, a second hinge HIG2_2 may rotate with respect to the folding axis FX, and the display module DM may be folded. The gear GAR may rotate with the second hinge HIG2_2 with respect to the folding axis FX. For example, the gear GAR may be connected to the pin unit PIN shown in FIG. 8, the pin unit PIN may be connected to the second hinge HIG2_2, and thus the gear GAR may rotate in a clockwise direction in accordance with the rotation of the second hinge HIG2_2.

As the gear GAR rotates, the gear belt GRB may be wound on the gear GAR. Accordingly, the first guide portion GP1 connected to the gear belt GRB may move along the first guide groove GG1_3. Since the first guide portion GP1 moves by the gear GAR and the gear belt GRB, which are engaged with each other, the first guide portion GP1 may more easily move.

Figure 24:
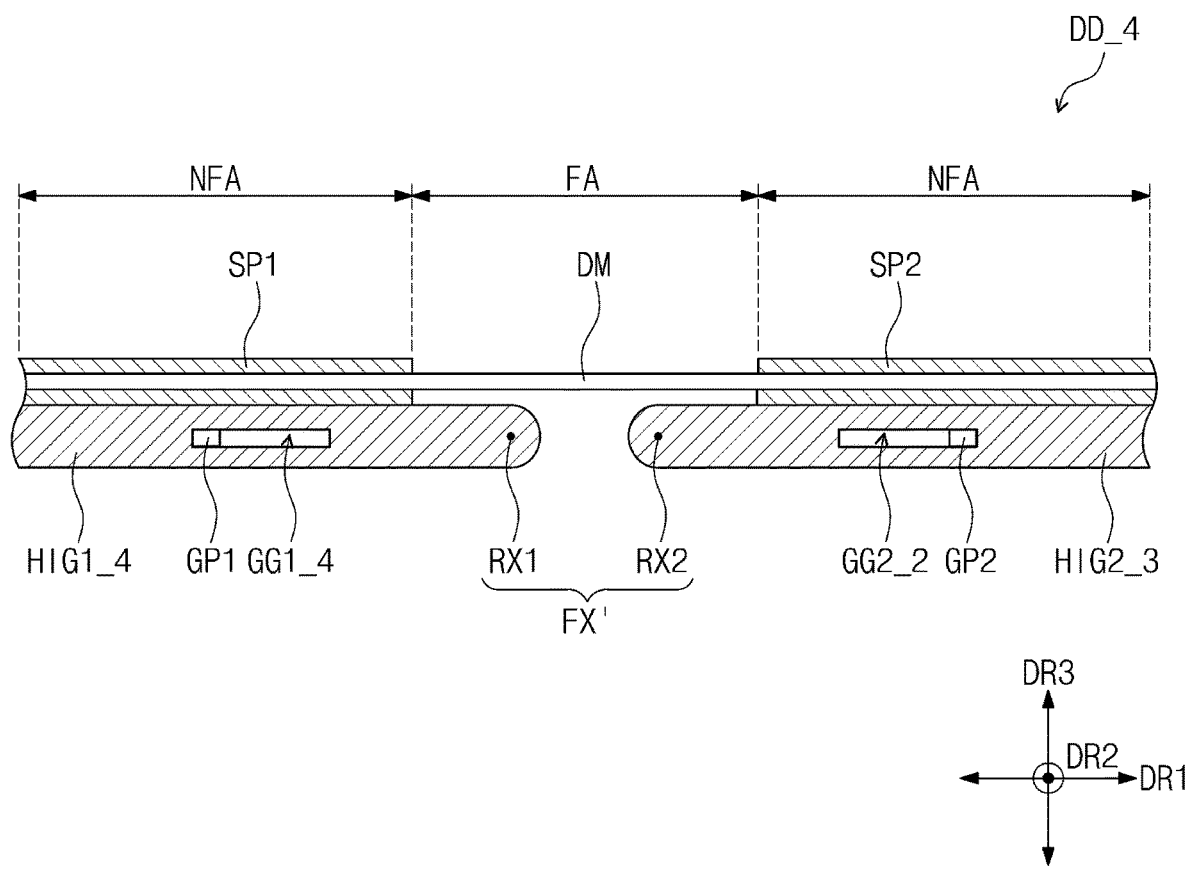
FIGS. 24 and 25 are views showing a configuration of a display device according to another embodiment of the present disclosure.
Figure 25:
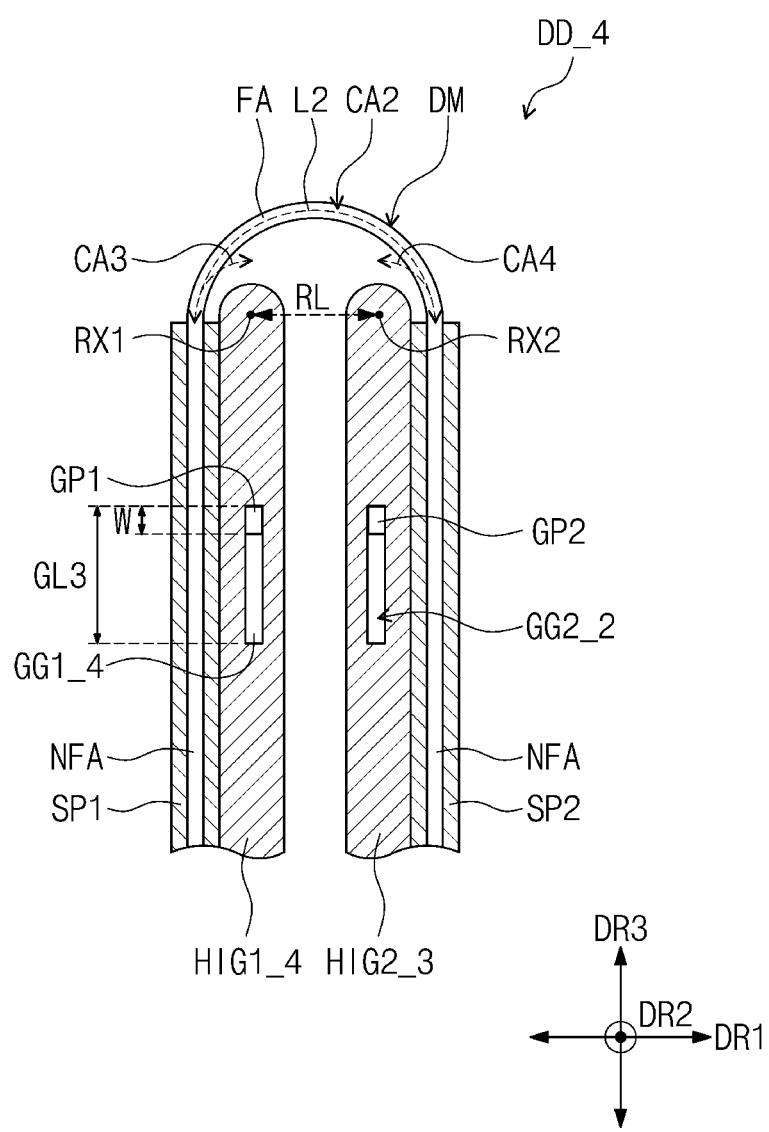

FIGS. 24 and 25 are views showing a configuration of a display device DD_4 according to another embodiment of the present disclosure.

For the convenience of explanation, FIGS. 24 and 25 show a cross section of the same section of a device as that shown FIGS. 9 and 12, respectively. Configurations of the display device DD_4 may be substantially the same as those of the display device DD shown in FIGS. 9 and 12 except for a structure in which first and second hinges HIG1_4 and HIG2-3 rotate with respect to a biaxial rotation axis. Accordingly, configurations of the display device DD_4, which are different from those of the display device DD, will be mainly described, and configurations that are the same as those of the display device DD are assigned with the same reference numerals.

Referring to FIG. 24, one side of the first hinge HIG1_4 and one side of the second hinge HIG2_3 may be spaced apart from each other and may face each other. A folding axis FX' may include a first rotation axis RX1 defined in the one side of the first hinge HIG1_4 and a second rotation axis RX2 defined in the one side of the second hinge HIG2_3. The first and second rotation axes RX1 and RX2 may be substantially parallel to the second direction DR2.

A first guide portion GP1 may be connected to a first supporter SP1 and may be inserted into a first guide groove GG1_4. A second guide portion GP2 may be connected to a second supporter SP2 and may be inserted into a second guide groove GG2_2.

Referring to FIG. 25, the one side of the first hinge HIG1_4 and the one side of the second hinge HIG2_3 may rotate with respect to the first rotation axis RX1 and the second rotation axis RX2, respectively, and thus the display module DM may be outwardly folded. The folding area FA may have a curved surface, and a length L2 of an arc CA of the folding area FA may be determined.

The folding axis FX of the display device DD shown in FIGS. 9 and 12 has one rotation axis, however, the folding axis FX' of the display device DD_4 may have two rotation axes RX1 and RX2. In the case of the display device DD having the one rotation axis, the length of the first and second guide grooves GG1 and GG2 may be determined depending on the length L of the arc CA formed with respect to one rotation axis.

However, because the display device DD_4 has two rotation axes RX1 and RX2, a length of the first guide groove GG1_4 and a length of the second guide groove GG2_2 may be determined depending on a length of an arc CA3 formed with respect to the first rotation axis RX1 and a length of an arc CA4 formed with respect to the second rotation axis RX2. Each of the two arcs CA3 and CA4 may be a ¼ circle arc.

The two arcs CA3 and CA4 are not the same as the arc CA2 of the folding area FA, but rather the two arcs CA3 and CA4 may be virtual arcs CA3 and CA4 formed around the first and second rotation axes RX1 and RX2. In this case, a length GL3 of each of the first and second guide grooves GG1_4 and GG2_2 may be determined based on the length L2 of the arc CA2 and a distance RL between the first rotation axis RX1 and the second rotation axis RX2, and may be obtained utilizing the following Equation 3.

$$2 \times GL3 = (L2 - RL) + (2 \times W),$$

$$GL3 = (L2/2 - RL/2) + W. \qquad \text{Equation 3}$$

Accordingly, the display device DD_4 may provide the first and second guide grooves GG1_4 and GG2_2 having the set or optimized length in accordance with the first and second rotation axes RX1 and RX2.

As used herein, the terms "use," "using," and "used" may be considered synonymous with the terms "utilize," "utilizing," and "utilized," respectively.

In addition, the terms "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Although the example embodiments of the present invention have been described, it is understood that the present invention should not be limited to these example embodiments but various changes and modifications can be made by one ordinary skilled in the art within the spirit and scope of the present invention as hereinafter claimed. Therefore, the disclosed subject matter should not be limited to any single embodiment described herein, and the scope of the present inventive concept shall be determined according to the attached claims and their equivalents.

What is claimed is:

1. A display device comprising:
   a display module comprising non-folding areas arranged with each other in a first direction and a folding area between the adjacent non-folding areas in the first direction;
   a hinge under the display module and configured to fold the display module with respect to the folding area;
   a supporter between the non-folding areas and the hinge; and
   a guide portion coupled to the supporter and configured to be inserted into a guide groove defined in the hinge,
   wherein the guide groove extends parallel to the non-folding areas, and a length in the first direction of the guide groove is obtained utilizing a length of an arc of the folding area of the display module in a folded state.

2. The display device of claim 1, wherein the arc is defined in a portion of the folding area between an inner side surface of the folding area, which is to not be exposed to an outside when the display module is not folded, and an outer side surface of the folding area, which is to be exposed to the outside when the display module is not folded.

3. The display device of claim 2, wherein the portion of the folding area in which the arc is defined is to be spaced from the inner side surface by about 300 micrometers to about 500 micrometers when the display module has a thickness of about 1 mm.

4. The display device of claim 1, wherein the supporter comprises:
   a first supporter; and
   a second supporter arranged in the first direction with the first supporter, the first and second supporters respectively overlapping with the non-folding areas and covering edges of the non-folding areas.

5. The display device of claim 4, wherein the first supporter comprises:
   a first bottom portion;
   a first sidewall portion extending upward in a third direction crossing the first direction from three sides of the first bottom portion and not extending from one side of the first bottom portion; and
   a first cover portion extending from the first sidewall portion to be parallel to the first bottom portion, and
   the second supporter comprises:
   a second bottom portion;
   a second sidewall portion extending upward in the third direction from three sides of the second bottom portion and not extending from one side of the second bottom portion; and
   a second cover portion extending from the second sidewall portion to be parallel to the second bottom portion,
   wherein the one side of the first bottom portion faces the one side of the second bottom portion.

6. The display device of claim 5, wherein the non-folding areas are respectively on the first and second bottom portions, and the first and second sidewall portions and the first and second cover portions respectively cover the edges of the non-folding areas.

7. The display device of claim 6, wherein an upper surface of the display module comprises:
   a display area; and
   a non-display area around the display area, and
   the first and second cover portions are on the non-display area.

8. The display device of claim 6, wherein the non-folding areas are respectively attached to the first and second bottom portions and not attached to the first and second cover portions.

9. The display device of claim 4, wherein the hinge comprises:
   a first hinge under the first supporter; and
   a second hinge under the second supporter, one side of the first hinge being connected to one side of the second hinge, wherein the one side of the first hinge and the one side of the second hinge are to rotate with respect to a folding axis extending in a second direction crossing the first direction.

10. The display device of claim 9, further comprising a pin unit extending in the second direction and connecting the one side of the first hinge to the one side of the second hinge, wherein the pin unit is aligned with the folding axis and the first and second hinges are to rotate with respect to the folding axis.

11. The display device of claim 9, wherein
the guide groove comprises:
 a first guide groove defined in the first hinge and extending in the first direction, and
 a second guide groove defined in the second hinge and extending in the first direction, and
the guide portion comprises:
 a first guide portion configured to be inserted into the first guide groove; and
 a second guide portion configured to be inserted into the second guide groove.

12. The display device of claim 11, wherein a length in the first direction of each of the first and second guide grooves is obtained utilizing the following Equation 1:

$$GL=L/2+W,\qquad \text{Equation 1}$$

wherein in Equation 1, "L" denotes a length of the arc, "GL" denotes the length of each of the first and second guide grooves, and "W" denotes a width, in the first direction, of each of the first and second guide portions respectively in the first and second guide grooves.

13. The display device of claim 11, wherein the first guide portion comprises a plurality of first guide portions connected to both sides of the first supporter facing oppositely away from each other in the second direction,
 the first guide groove comprises a plurality of first guide grooves defined in both side surfaces of the first hinge facing oppositely away from each other in the second direction,
 the second guide portion comprises a plurality of second guide portions connected to both sides of the second supporter facing oppositely away from each other in the second direction, and
 the second guide groove comprises a plurality of second guide grooves defined in both side surfaces of the second hinge facing oppositely away from each other in the second direction.

14. The display device of claim 11, wherein the first and second guide portions are configured to move along the first and second guide grooves, respectively, when the display module is folded, and a movement distance of each of the first and second guide portions is proportional to a folding angle of the display module.

15. The display device of claim 14, wherein the movement distance is linearly proportional to the folding angle.

16. The display device of claim 11, wherein each of the first and second guide portions comprises:
 a first extension portion connected to a corresponding supporter among the first and second supporters and extending in a third direction normal to a plane surface defined by the first and second directions; and
 a second extension portion extending in the second direction from a lower end of the first extension portion and configured to be inserted into a corresponding guide groove among the first and second guide grooves.

17. The display device of claim 9, further comprising a sub-supporter between the first hinge and the second hinge and under the folding area.

18. The display device of claim 17, wherein the sub-supporter has a semi-circular shaped curved surface when viewed in the second direction, and the semi-circular shaped curved surface faces the folding area.

19. The display device of claim 9, wherein the guide portion comprises a plurality of first guide portions connected to both sides of the first supporter facing oppositely away from each other in the second direction, the plurality of first guide portions configured to be inserted into a plurality of first guide grooves defined in the first hinge, each of the plurality of first guide grooves extending in the first direction, and
 a length in the first direction of each of the plurality of first guide grooves is obtained utilizing the length of the arc.

20. The display device of claim 19, wherein the length in the first direction of each of the plurality of first guide grooves is obtained utilizing Equation 2:

$$GL2=L+W,\qquad \text{Equation 2}$$

wherein in Equation 2, "L" denotes the length of the arc, "GL2" denotes the length of each of the plurality of first guide grooves, and "W" denotes a width, in the first direction, of each of the first guide portions respectively in the first guide grooves.

21. The display device of claim 19, further comprising:
 a gear at the one side of the first hinge; and
 a gear belt in a first guide groove of the plurality of first guide grooves and configured to be connected to a first guide portion of the plurality of first guide portions, the gear belt extending in the first direction to be above the gear and configured to be engaged with the gear,
 wherein the gear is to rotate together with the second hinge with respect to the folding axis.

22. The display device of claim 4, wherein the hinge comprises:
 a first hinge under the first supporter; and
 a second hinge under the second supporter, one side of the first hinge facing one side of the second hinge,
 wherein a first rotation axis is defined in the one side of the first hinge and a second rotation axis is defined in the one side of the second hinge, and
 the first and second hinges are to rotate with respect to the first rotation axis and the second rotation axis, respectively.

23. The display device of claim 22, wherein a length in the first direction of the guide groove is obtained utilizing Equation 3:

$$2\times GL3=(L2-RL)+(2\times W),$$

$$GL3=(L2/2-RL/2)+W,\qquad \text{Equation 3}$$

wherein in Equation 3, "GL3" denotes the length of the guide groove, "L2" denotes the length of the arc, "W" denotes a width, in the first direction, of the guide portion in the guide groove, and "RL" denotes a distance, in the first direction, between the first rotation axis and the second rotation axis.

24. The display device of claim 1, wherein the hinge is configured to outwardly fold the display module such that the display module is exposed to an outside.

25. The display device of claim 1, wherein the hinge is configured to inwardly fold the display module such that the display module is not exposed to an outside.

26. A display device comprising:
a display module comprising non-folding areas arranged with each other in a first direction and a folding area between the adjacent non-folding areas in the first direction;
a hinge under the display module and configured to fold the display module with respect to the folding area;
a supporter between the non-folding areas and the hinge; and
a plurality of guide portions coupled to the supporter and configured to be inserted into a plurality of guide grooves defined in the hinge,
wherein the guide groove extends parallel to the non-folding areas, and a length in the first direction of each of the plurality of guide grooves is obtained utilizing a length of an arc of the folding area of the display module in a folded state.

27. The display device of claim 26, wherein the folding area comprises:
an inner side surface to not be exposed to an outside when the display module is not folded, and
an outer side surface to be exposed to the outside when the display module is not folded, and
the arc is defined in a portion of the folding area that is to be spaced from the inner side surface by about 400 micrometers when the display module has a thickness of about 1 mm.

28. The display device of claim 26, wherein the supporter comprises a first supporter and a second supporter, which respectively overlap with the non-folding areas,
the hinge comprises:
a first hinge under the first supporter; and
a second hinge under the second supporter,
the plurality of guide grooves comprises:
a plurality of first guide grooves defined in the first hinge and extending in the first direction, and
a plurality of second guide grooves defined in the second hinge and extending in the first direction,
the plurality of guide portions comprises:
a plurality of first guide portions connected to the first supporter and configured to be respectively inserted into the plurality of first guide grooves; and
a plurality of second guide portions connected to the second supporter and configured to be respectively inserted into the plurality of second guide grooves,
wherein the first and second hinges are configured to rotate to fold the display module,
the plurality of first and second guide portions are configured to move respectively along the plurality of first and second guide grooves when the display module is folded, and
a sum of a maximum movement distance of one of the plurality of first guide portions and a maximum movement distance of one of the plurality of second guide portions corresponds to the length of the arc.

29. A display device comprising:
a display module comprising non-folding areas arranged with each other in a first direction and a folding area between the adjacent non-folding areas in the first direction;
a hinge under the display module and configured to fold the display module with respect to the folding area;
a supporter between the non-folding areas and the hinge; and
a guide portion connected to the supporter and configured to be inserted into a guide groove defined in the hinge and having a shape extending in the first direction,
wherein the guide groove extends parallel to the non-folding areas,
wherein a length in the first direction of the guide groove is obtained utilizing Equation 4:

$$GL2 = L + W, \qquad \text{Equation 4}$$

wherein in Equation 4, "L" denotes the length of an arc of the folding area of the display module in a folded state, "GL2" denotes the length of the guide groove, and "W" denotes a width, in the first direction, of the guide portion in the guide groove.

30. A display device comprising:
a display module comprising non-folding areas and a folding area between the non-folding areas;
a hinge under the display module and configured to fold the display module with respect to the folding area;
a supporter between the non-folding areas and the hinge; and
a guide portion coupled to the supporter and configured to be inserted into a guide groove defined in a part of the hinge that is to rotate with respect to a folding axis when the display module is folded,
wherein the guide groove extends parallel to the non-folding areas, and
wherein a movement distance of the guide portion in the guide groove is to be proportional to a folding angle of the display module when the display module is folded.

* * * * *